(12) United States Patent
Spivey

(10) Patent No.: US 7,338,159 B2
(45) Date of Patent: *Mar. 4, 2008

(54) ADJUSTABLE FOCUS LENSES

(76) Inventor: Brett Spivey, 7435 Neptune Dr., Carlsbad, CA (US) 92009

( * ) Notice: Subject to any disclaimer, the term of this patent is extended or adjusted under 35 U.S.C. 154(b) by 0 days.

This patent is subject to a terminal disclaimer.

(21) Appl. No.: 11/387,023

(22) Filed: Mar. 21, 2006

(65) Prior Publication Data
US 2006/0209431 A1 Sep. 21, 2006

Related U.S. Application Data

(63) Continuation-in-part of application No. 11/243,944, filed on Oct. 5, 2005, now Pat. No. 7,232,217, and a continuation-in-part of application No. 11/085,436, filed on Mar. 21, 2005.

(60) Provisional application No. 60/688,092, filed on Jun. 6, 2005.

(51) Int. Cl.
G02C 7/02 (2006.01)
G02C 7/10 (2006.01)
G02B 7/02 (2006.01)

(52) U.S. Cl. .................. 351/159; 351/164; 359/618
(58) Field of Classification Search ........ 351/158–159, 351/168–172; 359/793, 811, 813–815
See application file for complete search history.

(56) References Cited

U.S. PATENT DOCUMENTS 1,948,636 A 2/1934 Tillyer
3,507,565 A 4/1970 Alvarez
3,617,116 A 11/1971 Jones
5,644,374 A * 7/1997 Mukaiyama et al. ....... 351/169

* cited by examiner

Primary Examiner—Alicia M. Harrington
(74) Attorney, Agent, or Firm—John R. Ross

(57) ABSTRACT

A lens unit with two lens elements each having special surfaces such that an adjustment of the position of one of the two lens elements relative to the other in a direction generally perpendicular to a viewing direction changes the focusing power of the lens unit. In preferred embodiments two lens units are mounted in a frame to provide eyeglasses with adjustable focus. Several frame designs are described. In preferred embodiments two lens units, each lens unit having two lens elements are mounted in a frame to provide eyeglasses with adjustable focus. Several designs are described. Some designs provide for movement side to side movement of the lens elements relative to each other. In other designs the relative motion is up and down. A simple technique is a thumbscrew adjustment that is operated by the wearer. Another design is based on finger force against a friction force. In some preferred embodiments separate frames holding the lens elements pivot about pivot points on the earpiece of a support frame. In other designs two rear lens elements are mounted in a support frame and the front lens elements are mounted in a separate frame that pivots about a point on the earpiece of the support frame. Another design includes a torsion bar assures that the movements of each lens element in one of the lens units is the same as the movements of the lens elements in the other lens unit. Techniques for automatic focusing of the lenses are also disclosed. Techniques for automatic focusing of the lenses are also disclosed.

27 Claims, 16 Drawing Sheets

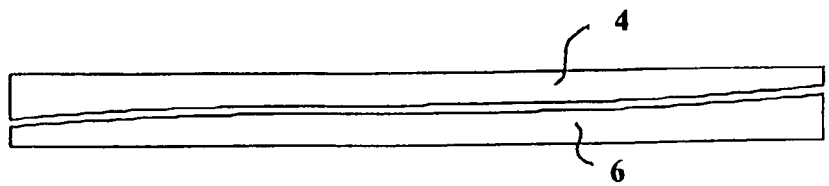
FIG. 2A
FIG. 2B
FIG. 2C
FIG. 2D
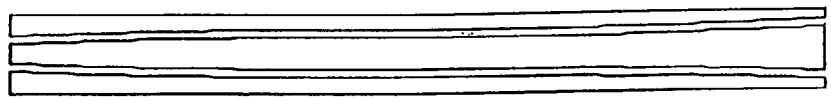
FIG. 3A
FIG. 3B
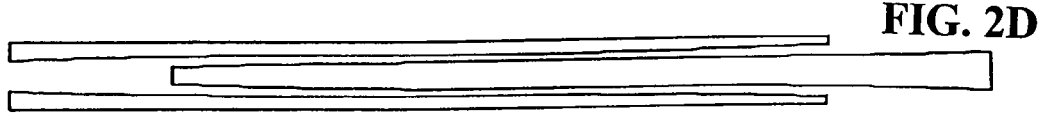
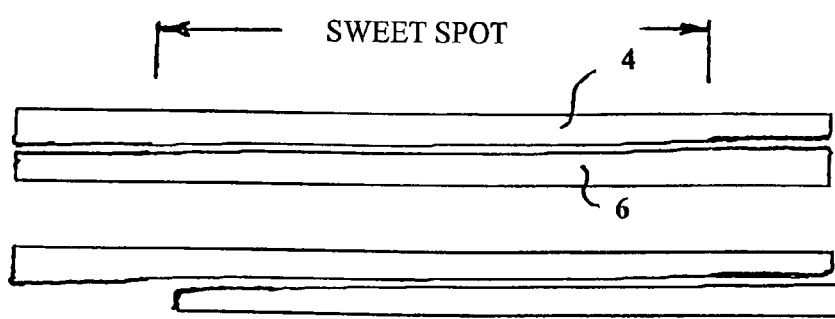
FIG. 2A(S)
FIG. 2B(S)
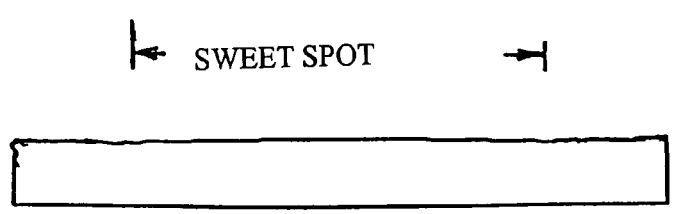
FIG. 2B(S)

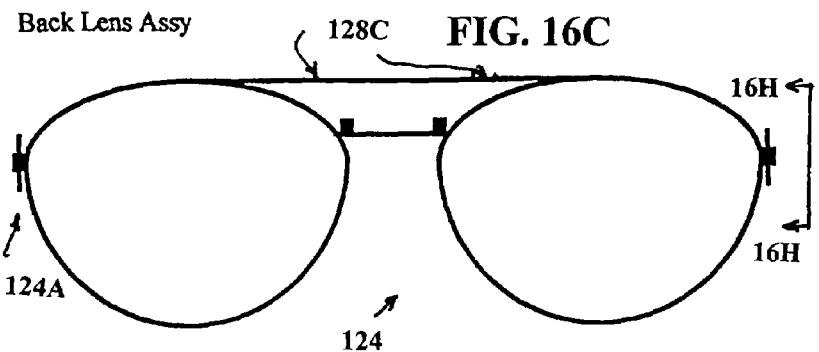
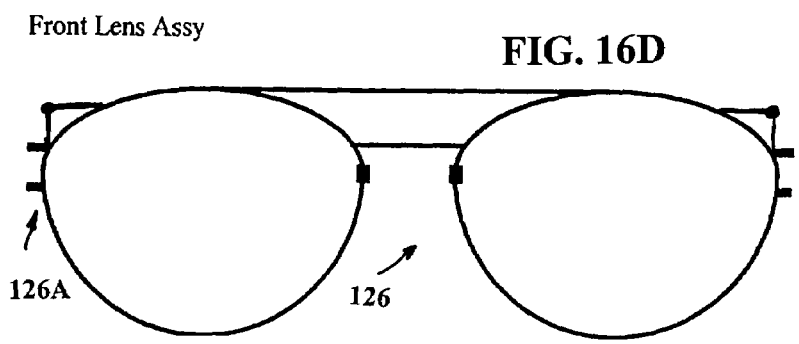
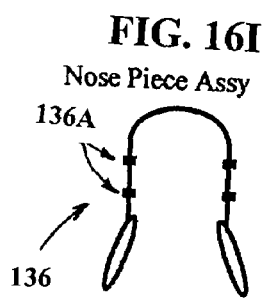
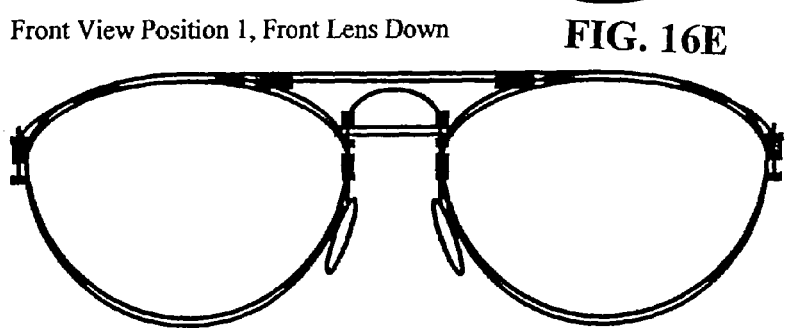
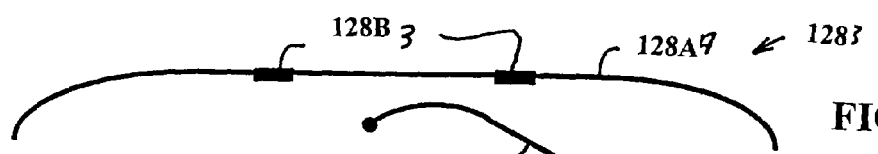
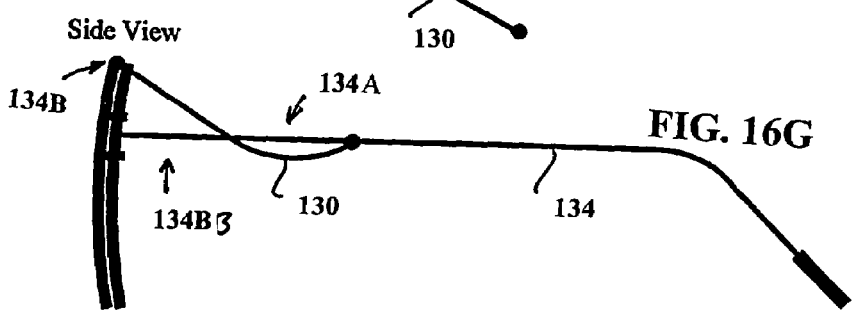

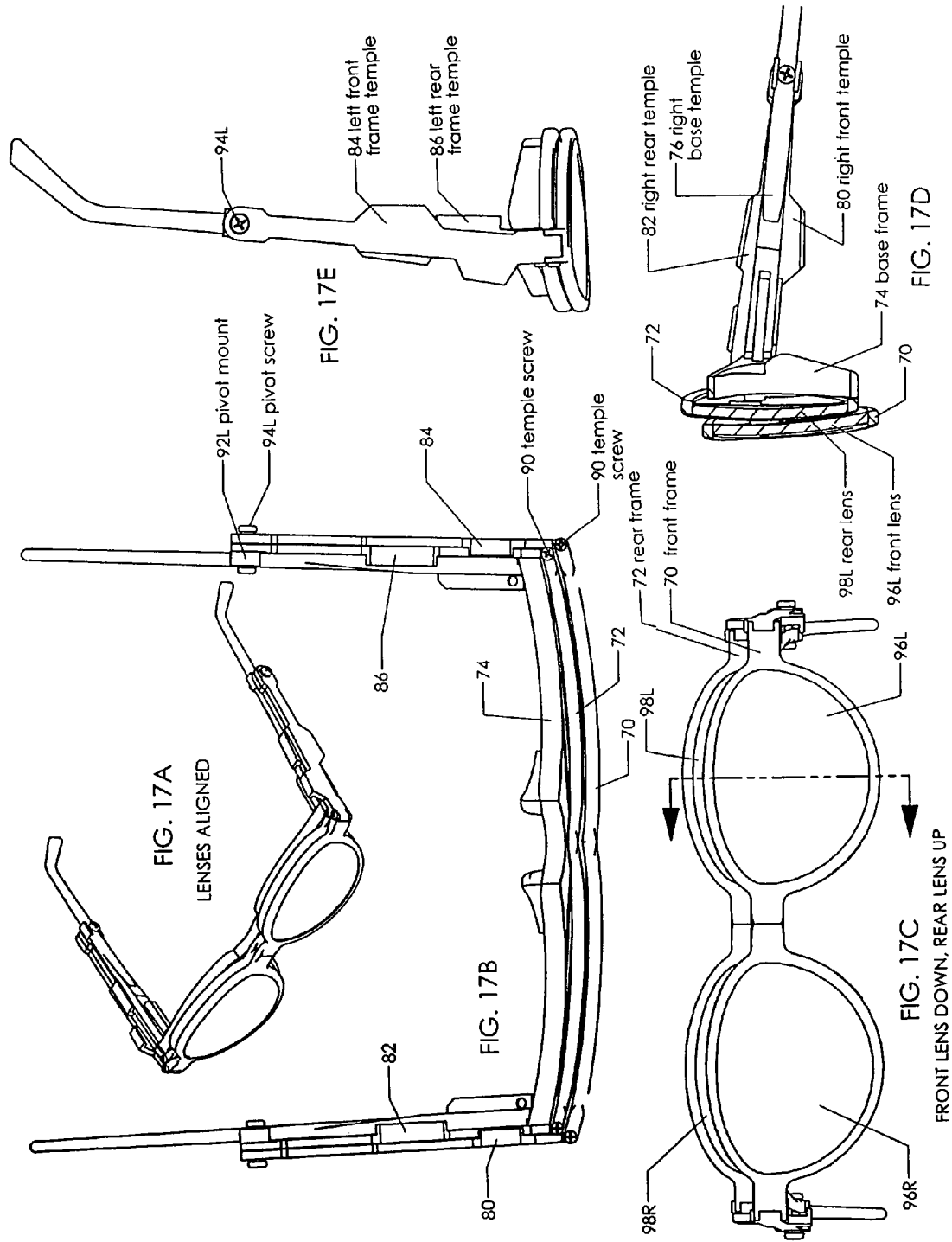

FRONT LENS UP, REAR LENS DOWN

FRONT AND REAR LENSES ALIGNED

FRONT LENS DOWN, REAR LENS UP

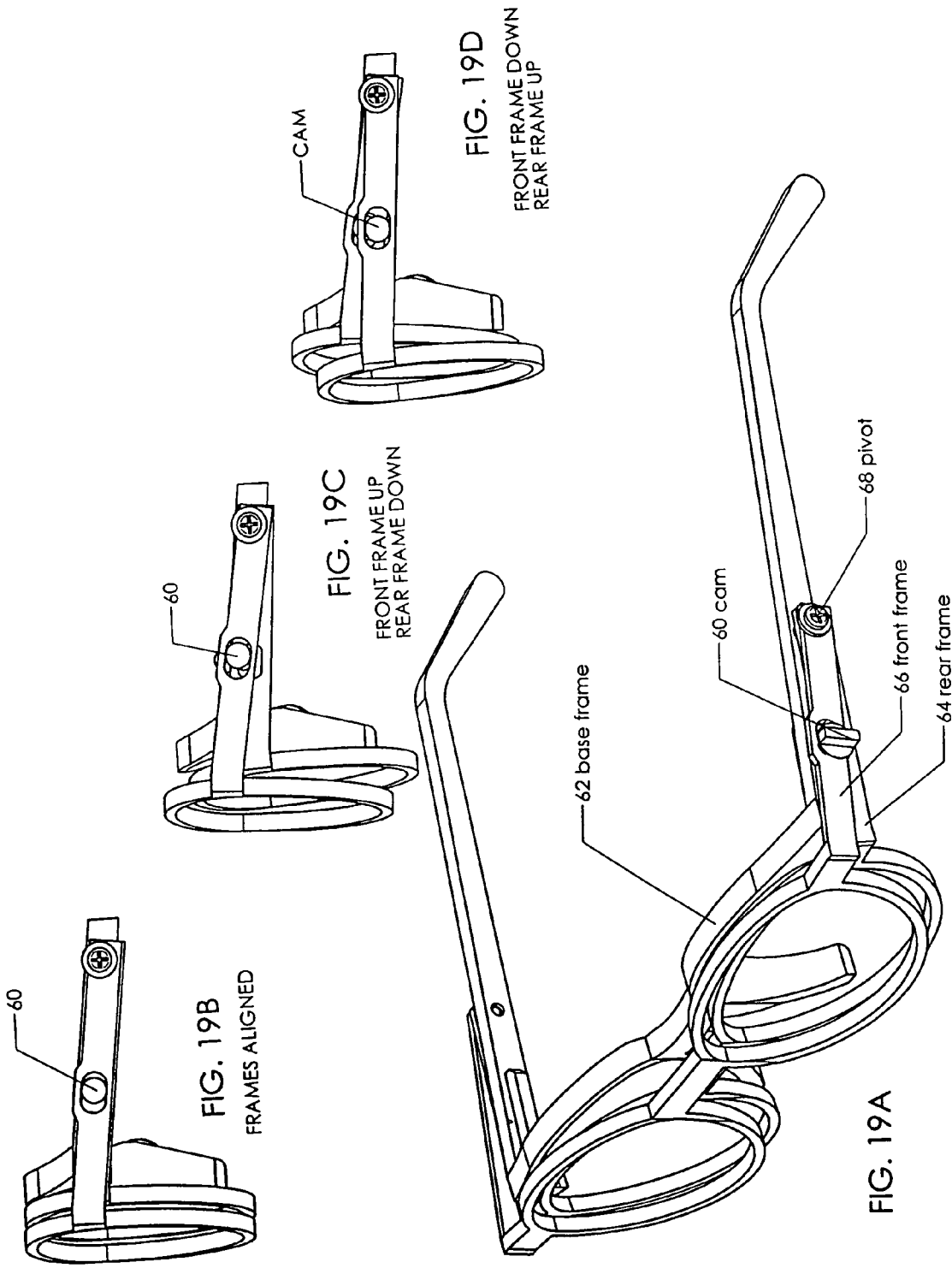

| RADIUS | RAD TOL | IRR TOL | C.A. DIA | EDGE DIA | MATERIAL | THICK | THI TOL |
|---|---|---|---|---|---|---|---|
| 150.00 CX | 2.00 MM | SEE NOTE 10 | 46.00 | 50.00 | POLYCARB | 2.25 | 0.15 |
| 171.00 CC | 2.00 MM | SEE NOTE 10 | 46.00 | | | | |

132 ↗

1. ALL DIMENSIONS IN MILLIMETERS
2. MATERIAL = POLYCARBONATE. ND = 1.586, VD = 34.0
3. INJECTION MOLD LENS TO RADII AND POLYNOMIAL INDICATED
4. MANUFACTURE PER MIL-O-13830
5. SCRATCH / DIG 80 / 50
6. OUTER DIAMETER TOLERANCE +/- 0.10
7. TIR < 0.03 (WEDGE < 2 ARCMIN)
8. SURFACE 1S IS A NON-ROTATIONALLY-SYMMETRIC POLYNOMIAL WITH THE FOLLOWING EQUATION DEFINING THE SURFACE DEVIATION FROM THE BASE RADIUS:

134 ↗ $T(X,Y) = -0.05X + 6.0E-5X^3 + 1.8E-4XY^2$

9. BOTH SURFACES TO REMAIN UNCOATED
10. TRANSMITTED WAVEFRONT PEAK-TO-VALLEY OPD < 1 FRINGE AS MEASURED OVER ANY 5MM SUBAPERTURE WITHIN SPECIFIED CLEAR APERTURE WHEN MEASURED WITH MATING LENS 'ADJUSTABLE POLYNOMIAL LENS A' SLOPE AND FOCUS ERRORS REMOVED. FRINGES MEASURED AT 632.8NM.
11. MOLD DESIGN TO ACCOMMODATE SHIMMING TO ALLOW FOR ADJUSTING NOMINAL THICKNESS BY +/- 0.5MM.

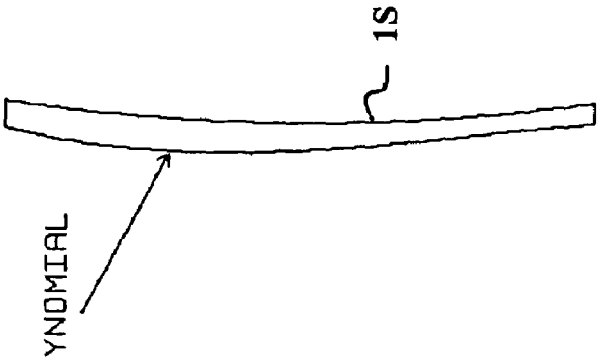

FRONT LENS 96

1S

POLYNOMIAL 10.00 MM

FIG. 20B

ADJUSTABLE FOCUS LENSES

This Application is a continuation in part of U.S. patent application Ser. No. 11/085,436 filed Mar. 21, 2005 and Ser. No. 11/243,944 filed Oct. 5, 2005, now U.S. Pat. No. 7,232,217 which are incorporated by reference herein and claims the benefit of Provisional Patent Application Ser. No. 60/688,092 filed Jun. 6, 2005. This invention relates to lenses and in particular to eyeglasses lenses and in particular to adjustable focus lenses and to processes for making eyeglass lenses.

BACKGROUND OF THE INVENTION

Nearsightedness and Farsightedness

Nearsightedness is a condition of the eye in which distance objects cannot be focused on the retina and farsightedness is a condition of the eye in which near objects cannot be focused on the retina. These conditions are normally corrected by spectacle lenses having a power needed to correct the eye's focus error.

Astigmatism

Astigmatism is a condition of the eye caused by an irregular curvature of an eye surface, usually the front surface. It can be corrected by a spectacle lens in which at least one surface has a different curvature in different planes through the lens axis.

Thin Lenses

In ophthalmology and optometry it is customary to specify the focal length of spectacle lenses in diopters. The power P of any lens in diopters D is defined as the reciprocal of the focal length f in meters (i. e., $P=1/f$). For thin lenses, the power P of a two lens ($P_1$ and $P_2$) stacked combination is the sum of the power of the two lenses (i. e., $P=P_1+P_2$). Stacking of two thin lenses 1 and 2 where $P_1=-P_2$ would produce a power of zero, equivalent to a flat plate. The two lenses do not perfectly cancel, but as long as the power is fairly weak (i.e., less than about 5 diopters), the human eye does not detect the residual aberration.

The Human Eye

The adjustable lens of the human eye, called the "crystalline lens", is located immediately behind the iris. The crystalline lens is comprised of 4 layers, from the surface to the center: the capsule, the sub-capsular epithelium, the cortex and the nucleus. The lens capsule is a clear, membrane-like structure that is quite elastic, a quality that keeps it under constant tension. As a result, the lens naturally tends toward a rounder or more globular configuration, a shape it must assume for the eye to focus at a near distance. Slender but very strong suspending ligaments, which attach at one end to the lens capsule and at the other end to protrusions of the circular ciliary body around the inside of the eye, hold the lens in place. When the ciliary body relaxes, the protrusions pull on the suspending ligaments, which in turn pull on the lens capsule around its equator. This causes the entire lens to flatten or to become less convex, enabling the lens to focus light from objects at a far away distance. Likewise when the ciliary muscle contracts, tension is released on the suspending ligaments, and on the lens capsule, causing both lens surfaces to become more convex again and the eye to be able to refocus on near objects. This adjustment in lens shape, to focus at various distances, is referred to as "accommodation". The "amplitude of accommodation" of an eye is the maximum amount that the eye's crystalline lens can accommodate. This amount is very high when young and decreases with age.

The cornea of the human eye is also important in providing focus. In fact, the cornea provides by far the greatest optical power in the eye, with a power of 43.0 D. The entire optical system of the eye has a power of 58.6 D. This causes the light entering the eye to focus onto the retina. The power of the cornea cannot be adjusted, except by surgery.

Presbyopia

After age 40 in most people (and by age 45 in virtually all people) a clear, comfortable focus at a near distance becomes more difficult with eyes that see clearly at a far distance. This normal condition is known as "presbyopia", and is due both to a lessening of flexibility of the crystalline lens and to a generalized weakening of the ciliary muscle. By the time one reaches 65 or so, the crystalline lens is virtually incapable of changing shape. Unless one is nearsighted, it is not possible to focus objects (such as a printed page) clearly at even an arm's length distance. The amount of presbyopia inevitably increases with age. Eyeglasses are usually used to provide correct focus as needed. These eyeglasses include bifocal, trifocal, and continuous focal glasses. Other solutions include separate glasses for distance and reading.

Attempts have been made to design glasses providing adjustable focus. Suggested techniques include: (1) pumping a clear fluid between thin lenses that bulge with increasing pressure (U.S. Pat. No. 2,567,581), (2) use of voltage controlled liquid crystal nematic material to change refractive indexes (U.S. Pat. No. 5,359,444) and (3) use of a variety of pixilated electro-active materials (U.S. Pat. No. 6,733,130). These prior art patents are incorporated herein by reference. These prior art patents disclose techniques for finding automatic focus settings for these glasses. These techniques include range finders and small camera viewing of both eyes to detect distances being observed. These prior art patents also describe small processors and drivers to control focus based on estimates of the distances.

Numbers of Lenses Needed To Correct Focus and Astigmatism

No two eyes are exactly alike and if we live long enough we will all need vision correction. So a very large percentage of the people on earth will need glasses. Glasses can be specially made to fit each person's prescription, but this would be expensive and time consuming. In most cases eye care facilities stock a variety of lenses with ranges of focal and astigmatism correction. Then for each patient lenses are chosen from this stock of lenses that most closely matches the patient's needs. The bigger variety in the stock of lenses the closer the needs can be matched in general but also the larger the stock the more expensive it is to maintain the stock.

Bifocals, trifocal and continuous focus glasses all have their problems as is well known by the people who wear them, and the automatic focus glasses have not been successful in solving the problems. Surgery can correct vision problems in many cases, but eye surgery is expensive and many people who can afford eye surgery, prefer to avoid it.

What is needed is a better technique for solving problems of human eye focus including the problems associated with presbyopia that we will all encounter, if we live long enough.

SUMMARY OF THE INVENTION

The present invention provides a lens unit with at least two lens elements. A mechanism is provided to adjust the position of one of the two lens elements relative to the other in a direction generally perpendicular to a viewing direction. At least a portion of a surface of the first lens element is a specially designed surface defining a first complementary surface and at least a portion of a surface of the second lens element is a surface defining a second complementary surface that is substantially complementary to the first complementary surface. The designs of the specially designed surfaces are chosen such that small adjustments of the relative positions of the two lenses in directions perpendicular or approximately perpendicular to a viewing direction results in changes in the combined focus of the two lenses of the lens unit.

Complementary Surfaces

In a preferred embodiment the specially designed surface of the first lens of each lens unit is described by:

$$Z(X,Y)=C_1*(X^3/3+XY^2)+C_2,$$

where $C_1$ and $C_2$ are constants. And the specially designed surface of the second lens of each lens unit is described by:

$$Z_C(X,Y)=-C_1*(X^3/3+XY^2)+C_2.$$

When the two lenses are stacked, as long as the thickness variations are small the effective thickness of both lenses is equal to:

$$Z(X,Y)+Z_C(X,Y)=2*C_2,$$

which is the expression for a flat plate. If the location of $Z_C$ in the x direction is changed by a small amount, dx, then the thickness variations do not cancel anymore, and the net thickness is:

$$Z(X,Y)+Z_C(X+dx,Y)=2*C_2+-C_1*(dx*(X^2+Y^2)+dx^2*X+dx^3/3).$$

This is the expression for a powered optic, either a focusing or diverging lens, depending on the sign of $C_1$.

The above equations define positions Z(X,Y) on a surface of the lens as a function of X and Y assuming the assuming the other surface is flat (i.e. Z is constant). In most preferred embodiments the second surface of each lens will have some curvature. Typically, the second surface will be a portion of the surface of a sphere with a constant radius. In these cases the above equations for the specially designed surfaces need to be modified so that the Z defining the specially designed surface includes the curvature of the other surface. In preferred embodiments with two lenses defining an outer surface, two inner surfaces and an inside surface, the inner and outer surfaces are spherical with the outer surface having a slightly larger radius of curvature than the inner surface. This provides the lens unit a basic power when the two lenses are in their null position. The two inside surfaces are provided with the special surfaces as defined by the above equations modified in each case by the curvature of their second surfaces. With this arrangement the lenses need to be shifted laterally relative to each other to produce a zero power for the lens unit.

Reducing Profile Variation

In other preferred embodiments a $C_3X$ term is added to one surface and subtracted from the complementary surface to reduce the profile variation of each of the lenses.

Adjustable Frame Designs

In preferred embodiments two lens units, each lens unit having two lens elements are mounted in a frame to provide eyeglasses with adjustable focus. Several designs are described. Some designs provide for movement side to side movement of the lens elements relative to each other. In other designs the relative motion is up and down. A simple technique is a thumbscrew adjustment that is operated by the wearer. Another design is based on finger force against a friction force. In some preferred embodiments separate frames holding the lens elements pivot about pivot points on the earpiece of a support frame. In other designs two rear lens elements are mounted in a support frame and the front lens elements are mounted in a separate frame that pivots about a point on the earpiece of the support frame. Another design includes a torsion bar assures that the movements of each lens element in one of the lens units is the same as the movements of the lens elements in the other lens unit. Techniques for automatic focusing of the lenses are also disclosed.

Fixed Lens Eyeglasses Utilizing the Present Invention

In other embodiments of the present invention, the lens units are first adjusted relative to each other to provide a desired focusing power then fixed in a frame to provide fixed lens units with a fixed power. When the present invention is utilized to make fixed-lens eyeglasses, a very wide variety of lens powers can be produced with a minimal stock of lenses. Each lens unit of these eyeglasses comprises at least two lens elements. The first of the two lens elements in a lens unit has a specially designed surface providing a special varying lens thickness as a function of position across the lens surfaces, and the second of the two lens elements has specially designed surface providing a varying lens thickness that is substantially complementary to the varying thickness of the first lens element. The designs of the surfaces are chosen such that small adjustments of the relative positions of the two lenses in a first direction predominantly perpendicular to the viewing direction results in changes in the combined focus of the two lenses of each lens unit. Astigmatism is corrected by a small adjustment in a second direction perpendicular to the first direction followed by a rotation of the two lenses about the axis of the two lenses. When the adjustments have been made the two lenses are fixed with respect to each other and installed in eyeglass frames. Cutting to the shape of the eyeglass frames can occur either before or after the fixing.

BRIEF DESCRIPTION OF THE DRAWINGS

FIGS. 2A through 2D and 3A and B compare a lens system with single-lens units with a system with one of the lens units being a two-lens unit.

FIGS. 9A-14A show optical conditions that were computer simulated with CAD optical software.

FIGS. 9B-14B show the results of the FIGS. 9A-14A simulations.

FIGS. 15-19D show features of adjustable frame designs.

FIGS. 20A and 20B show the molding specifications for a preferred polycarbonate lens design.

DETAILED DESCRIPTION OF PREFERRED EMBODIMENTS

Theory

Consider a first lens with a surface described by:

$$Z(X,Y) = C_1 * (X^3/3 + XY^2) + C_2,$$

where $C_1$ and $C_2$ are constants. Consider a second lens with a surface described by:

$$Z_C(X,Y) = -C_1 * (X^3/3 + XY^2) + C_2.$$

When the two lenses are stacked, as long as the thickness variations are small the effective thickness of both lenses is equal to:

$$Z(X,Y) + Z_C(X,Y) = 2 * C_2,$$

which is the expression for a flat plate. If the location of $Z_C$ in the x direction is changed by a small amount dx, then the thickness variations do not cancel anymore, and the net thickness is:

$$Z(X,Y) + Z_C(X+dx,Y) = 2*C_2 + -C_1*(dx*(X^2+Y^2) + dx^2*X + dx^3/3).$$

This is the expression for a powered optic, either a focusing or diverging lens, depending on the sign of $C_1$. The second to the last term creates a slight shift in the image position but does not change the focusing properties of the optic. The complicated third order shapes mostly cancel, as they did when the lenses were exactly lined up, leaving a variable focal length lens that is focused by an amount proportional to the lateral displacement of the first lens with respect to the second lens.

The above equations define positions Z(X,Y) on a surface of the lens as a function of X and Y assuming the other surface is flat (i.e. Z is constant). In most preferred embodiments the second surface of each lens will have some curvature. Typically, the second surface will be a portion of the surface of a sphere with a constant radius. In these cases the above equations for the specially designed surfaces need to be modified so that the Z defining the specially designed surface includes the curvature of the other surface. In preferred embodiments with two lenses defining an outer surface, two inner surfaces and an inside surface, the inner and outer surfaces are spherical with the outer surface having a slightly larger radius of curvature than the inner surface. This provides the lens unit a basic power when the two lenses are in their null position. The two inside surfaces are provided with the special surfaces as defined by the above equations modified in each case by the curvature of their second surfaces. With this arrangement the lenses need to be shifted laterally relative to each other to null the lens unit. Then, any lateral movement in one direction will increase the power of the unit and any movement in the opposite direction will decrease the power of the lens unit. In other embodiments the inner and outer surfaces could be provided with more complicated surfaces when desired to correct other visual conditions such as astigmatism. The other surfaces could also be designed to achieve many other eyeglass designs such as aviator glasses and wrap-around glasses.

First Proposed Embodiment

Figure 1:
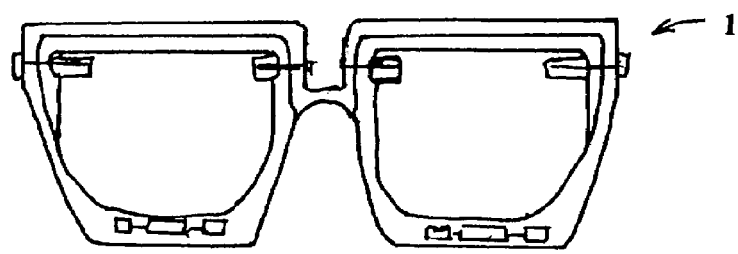
FIG. 1 is a drawing of a prototype set of eyeglasses based on the present invention.
Figure 2:
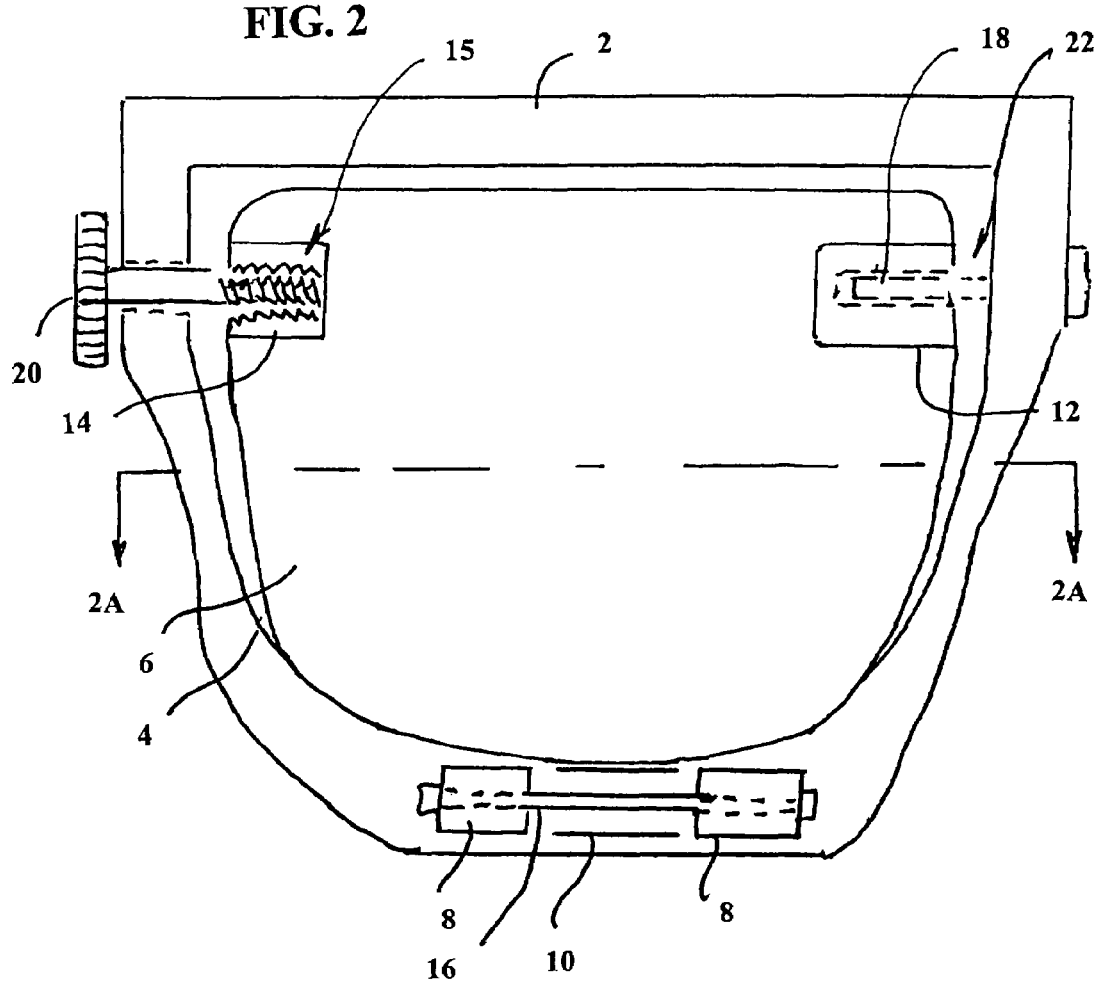
FIG. 2 is a larger view of one of the lenses of the eyeglasses shown in FIG. 1.

A first proposed version of the present invention is shown at 1 in FIG. 1. This is a drawing of a pair of eyeglasses with wearer operated focusing lenses. This embodiment includes metal or plastic frame 2, two back lenses 4 and two front lenses 6. Back lenses 4 are mounted rigidly on frame 2. A more detailed version of each lens pair is shown in FIG. 2. Front lenses 6 are mounted so that they can be moved laterally with respect to back lenses 4. Two pen mounts 8 are attached rigidly to frame 2 and tabs 10, 12 and 14 are attached rigidly to front lenses 6. Pen 16 passes through pen mounts 8, allowing it to slide through tab 10. Pen 18 passes through frame 2, allowing it to slide through tab 12. Adjustment screw 20 passes through frame 2 and screws into treaded socket 15 in tab 14. Spring 22 between frame 2 and tab 12 provides a compressive force in the direction of adjustment screw 20. The wearer of the glasses shown in FIG. 1 adjusts the focus of each of the lenses by rotating adjustment screws 20 as shown in FIG. 2.

FIG. 2A shows a cross section view (cut in the horizontal plane) through back lens 4 and front lens 6 showing the relative vertical positions of the two lenses. Note that the curvature of lens 6 is the complement of the curvature of lens 4. The effect of this pair of lenses is approximately equivalent to a flat plate shown in FIG. 3A. In FIG. 2B lens 6 is offset to the right by 20 percent of the lens width. The net result of the offset is to produce the equivalent of a convex surface as shown in FIG. 3B, to bring the wearer's focal point nearer to him as compared to its uncorrected location. The reader will appreciate that if lens 6 is moved farther to the left with respect to lens 4, a concave surface will be the effective result, thus moving the wearer's focal point farther away as compared to the location of his uncorrected focal point.

Specific Example

Applicant has performed ray trace calculations of the sliding lens system to verify that the optical quality is sufficient for eyewear. As an example calculation, Applicant used a pair of optics with one flat surface and one cubic surface. The flat surfaces are on the outside and the cubic surfaces are facing each other such that there is a 0.1 mm gap between the optics when in the null position, with the effect of the cubic surfaces nearly canceling each other out. The optics are assumed to be made of a typical glass with index of refraction of 1.5. The strength of the cubic surface is described by:

$$Z = \frac{1}{60 \text{ cm}^2} \left( \frac{x^3}{3} + xy^2 \right)$$

Figure 5:
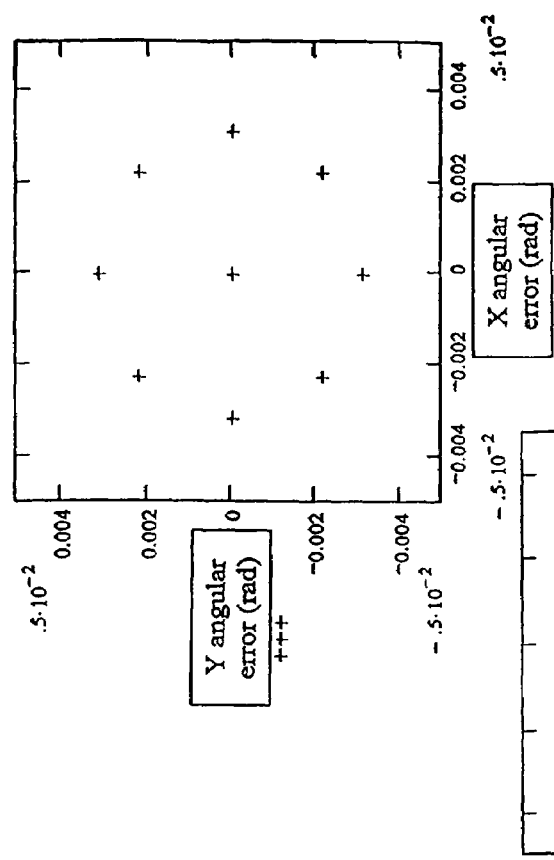
FIGS. 4, 5 and 6 are plots of results of ray trace calculations.
Figure 6:
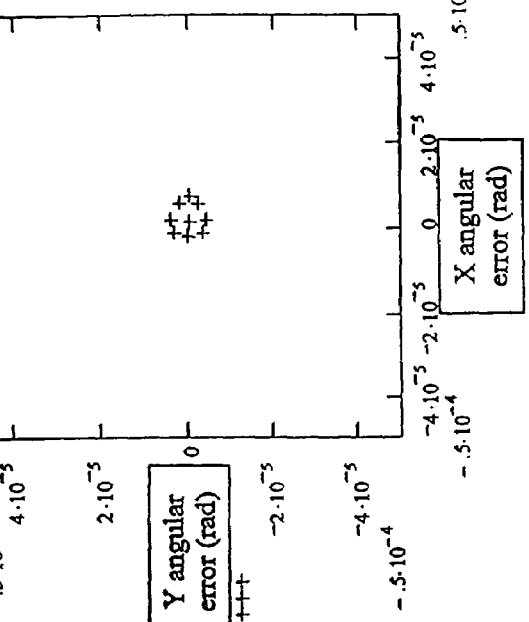
Figure 4:
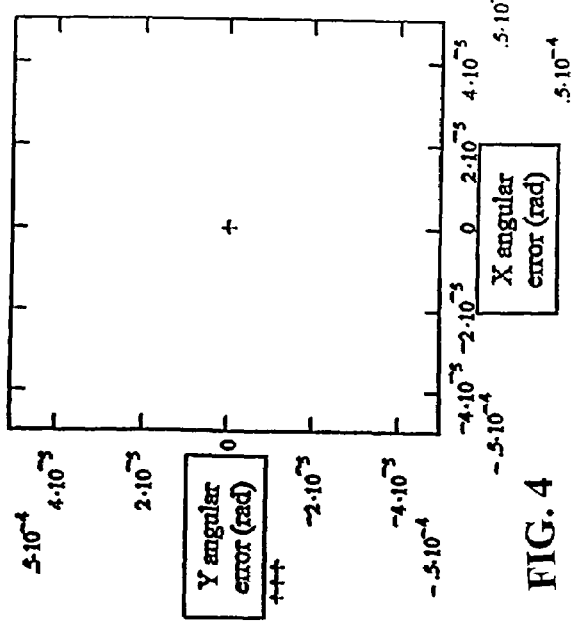

The eye was modeled as having pupil diameter of 4 mm, with the pair of optics placed 2 cm in front of the eye. The eye is pointed to look at an object directly in front of the subject, with the center of the eye 3 cm from the centerline of the subject. The eyeball diameter was assumed to be 4 cm. The rays originate at the eye and travel to a plane at various distances from the eye, which demonstrates the pattern that the eye senses at the object. In FIGS. 4, 5 and 6 Applicant has plotted these patterns divided by the distance so that the errors are represented as angles.

The eye is first pointed at an object 10 meters away, with the eyeball properly focused at this 10-m focal length. This weak focusing at 10 meters is very close to an infinite focal length. The lenses are in the aligned position, with 0.1-mm gap. The resulting pattern at the object is shown FIG. 4. Plotted is the angular position of nine rays. They are packed so closely in the center that the positions cannot be distinguished. The scale of the outer box is the approximate diffraction resolution limit for the eye—approximately 0.1 milli-radian. The small pattern compared to this dimension indicates that the level of aberration will not be noticeable.

Next, Applicant moves the object plane in to 60 cm and re-points the eye, but does not refocus the eye. He first calculates the resulting angular pattern without readjusting the optics, and gets the pattern shown in FIG. 5. The angular scale on this plot is 100 times larger than the previous plot, and it can be seen that the lack of proper focus greatly degrades the eye's limiting resolution, which is $\frac{1}{100}$ of the total box size. Then, to refocus the glasses-eye optical system, he slides the lens 6 laterally in the plus x direction a distance of 1.012 cm. (This could be accomplished in the FIG. 2 example by rotating adjustment screw 20.) The resulting ray angular locations at 60 cm are shown in FIG. 6. Here Applicant has plotted the data on the original scale, for which the outer box size is the limiting resolution. The much smaller spot cluster indicates that the level of aberration will not be noticeable, and that the lenses have properly refocused the glasses-eye system.

Moving only lens 6 (relative to lens 4 and the eye of the patient) requires a slight re-pointing of the eye. In order to preserve the eye's pointing direction, he would need to slide the first lens 7.2 mm in the x direction, and slide the second lens 2.92 mm in the minus x direction opposite from the first lens, for a net off-set of 1.012 cm. The reader will understand that providing adjustments for both lenses adds some complication to the design shown in FIGS. 1 and 2, but could be done by, for example, using another adjustment screw.

Sweet Spot

As shown in FIGS. 2A and 2B, the application of the above described equations for lens thickness results in each of the lenses being significantly thicker at one edge as compared to the opposite edge. In many applications perfect focus will not be needed at each edge of the lenses. Therefore, in preferred embodiments a sweet spot is provided in the region of the lenses centered directly in front of the wearer's eyes (when looking straight ahead), and within a certain cone angle, by precise application of the above equations in the sweet spot, but choosing a different lens design outside the sweet spot. This different design can be based on well-known prior art lens design techniques for the net thickness of both lenses taken together. An example is shown in FIGS. 2A(S), 2B(S) and 3B(S) where lenses 4 and 6 have been modified outside the sweet spot to make the lenses more uniform at the edges. In preferred embodiments, once this desired shape outside the sweet spot is determined equations for the lens thickness of the two lenses outside the sweet spot can be determined by integration of the equation for the desired net thickness of both lenses taken together. To create this function, we use the following procedure:

a. We start with the desired net thickness function we want in the center, which is usually a focus f_desired(x,y)= $C1*(X^2+Y^2)+C2$, where C1 and C2 can be positive or negative
 b. Create a function which approximates this in the center but which deviates away from the center f_actual(x,y)
 c. Integrate f_actual(x,y) with respect to x to get the function to apply to the lens f_lens(x,y)
 d. When two complementary lenses of thickness f_lens are displaced in the x direction by dx, the net thickness is approximated by f_actual multiplied by dx.

Techniques for Use

This simple preferred embodiment of the present invention provides important improvements over prior art glasses such as bifocals, trifocals and continuous focal lenses. The lenses can each be adjusted by the user so that his viewed object is exactly in focus through all portions of the sweet spot which can be made as large as desired. This is especially advantageous if the viewed object is stationary with respect to the wearer such as when reading, working at the computer, watching TV and watching a movie. Many of the potential embodiments of he present inventions do not provide for very quick adjustment of the focus. This could be somewhat of a problem in situations, for example, when a student is watching a lecturer and taking notes at the same time. A simple solution in these situations, however, would be to provide for separate adjustment of the two lens units and for the wearer to adjust one lens to focus on the lecturer and the other lens to focus on his notes. His brain will then take over and in each case produce images using data from the in-focus eye.

Vertical Movement to Adjust Focus

Figure 7:
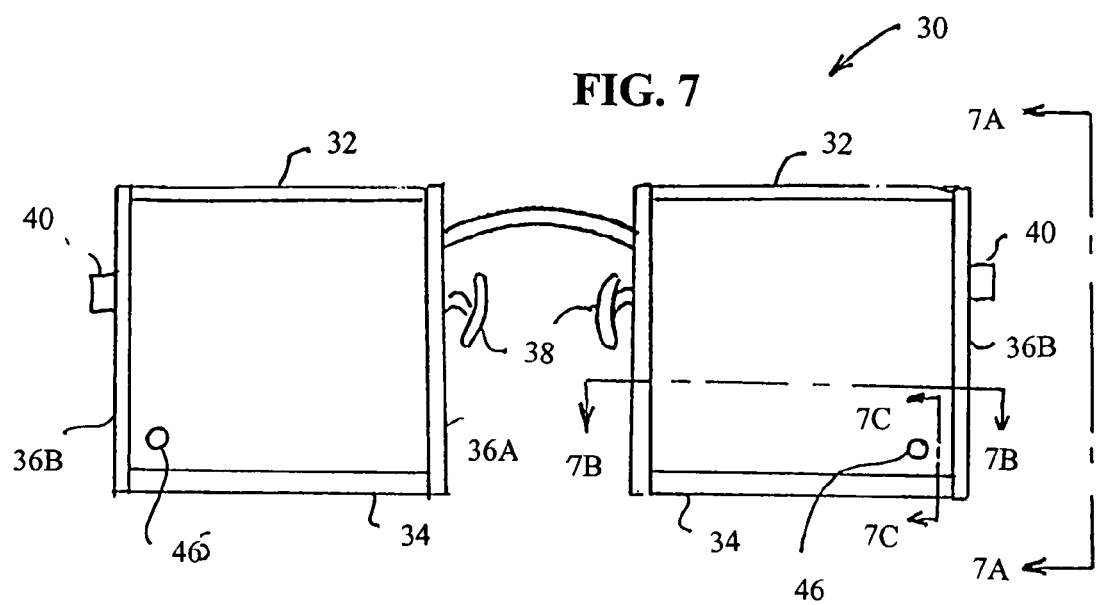
FIGS. 7, 7A, & B and 7C show features of a preferred embodiment where the lenses are moved vertically to adjust focus.
Figure 7B:
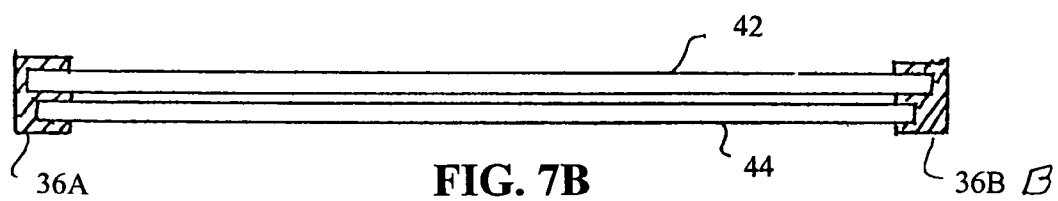
Figure 7A:
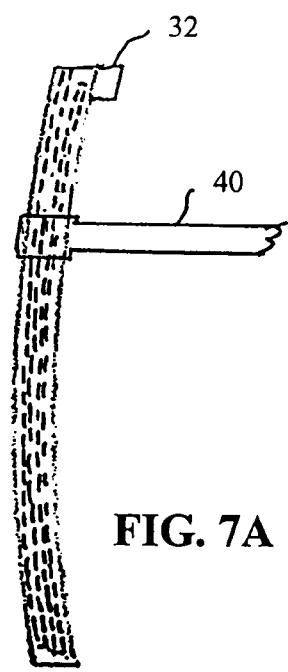
Figure 7C:
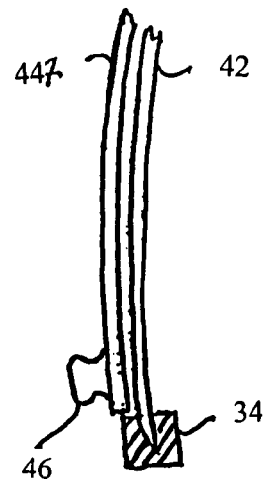

There are some significant advantages of using vertical adjustment of the two lenses relative to each other to provide focus changes. The principles described above for horizontal adjustment apply equally well for the vertical adjustment, by interpreting x as the vertical direction and y as the horizontal direction. Features of a set of glasses designed for vertical adjustment are shown in FIGS. 7, 7A, 7B and 7C. A sketch of a set of glasses is shown in FIG. 7. The two generally cylindrical shell lenses, back lens 42 and front lens 44, for each eye are held in a frame with top frame element 32, side elements 36A and 36B and bottom frame elements 34. The glasses include nosepieces 38 and ear elements 40. In this embodiment the two lenses have a cylindrical shape (with radii of about 5 inches) and the special surfaces for focus adjustment are applied to the inside surfaces in both cases. In this embodiment back lens 42 is fixed to the frame but front lens 44 is free to slide up and down in slots in frame elements 36A and 36B as shown in FIG. 7B. The slots in the frame elements 36A and 36B and lens 44 have the same radii of curvature. A tight fit is provided so that sliding occurs only when significant finger force is applied to lens 44. A tab 46 may be provided at the bottom corner of the lenses for applying this force to change the focus.

Automatic Adjustments of Focus

Several prior art patents have proposed techniques for automatic adjustments of the focus of eyeglass lenses. These techniques attempt to determine the distance to the viewed object and then automatically adjust the focus of the lenses in the eyeglasses based on stored information so that the object is in focus for the wearer. These techniques include range finders and small camera viewing both eyes to detect distances between the pupils and small processors and drivers to calculate distances and control focus based on the calculated distances. Cues from the wearer can also be used as a signal to provide an automatic adjustment of the focus. For example, a wink of only the right eye could be a cue to increase the length of focus and a wink of only the left eye could be a cue to decrease it. Additional equipment would have to be added to the basic embodiment described above. Needed would be a motor and actuator with a power source to provide the lateral displacement provided in the example by adjustment screw 20. A small processor could be used to translate cues provided by the range finder, camera or wearer into instructions for the motor and actuator. Specific equipment of this general type for determining distances to viewed objects is described in the patents referenced in the background section.

As an example, a system can be used to measure inter-pupil distance. This system would provide a determination of the distance of the object that the eyes are pointed at. If an object is far away, each eye is pointed in approximately the same direction. As the object moves closer, the eyes start to cross so that both are pointed at the object. Small cameras can take digital images of each of the eyes and a miniature digital processor can compute the offset distance that maximizes the correlation of the two images. This offset, when added to the camera separation, yields inter-pupil distance. This inter-pupil distance can be converted by the same digital processor into a range $t_0$ the object, which is then converted to an offset distance for the sliding lenses. The processor then commands the motor/actuator to position the lenses in the proper position.

Techniques for Improving Profile

The reader should note that if the polynomial surface includes certain other terms, then the basic functionality is preserved, and is substantially equivalent. In particular, if we select the direction of relative motion to be the X-direction, then any polynomial of degree less than 3 can be added and any function of Y but not X can be added. If:

$$Z(X,Y)=C_1*(X^3/3+XY^2)+C_2+C_3*X^2+C_4*XY+C_5*Y^2+C_6*X+C_7*Y+C_8+C_9*F(Y)$$

and $$Z(X,Y)=-C_1*(X^3/3+XY^2)+C_2-C_3*X^2-C_4*XY-C_5*Y^2-C_6*X-C_7*Y-C_8-C_9*F(Y)$$

then $$Z(X,Y)+Z_C(X+dx,Y)=2*C_2+-C_1*(dx*(X^2+Y^2)+dx^2*X+dx^3/3)-C_3*(2*dx*X+dx^2)-C_4*dx*Y-C_6*dx$$

The result consists of the terms from before (first line) plus new terms (second line). The new terms have a component proportional to X, which results in an angular displacement of the image in the X-direction; a component proportional to Y, which results in an angular displacement in the Y-direction; and 2 terms with neither X nor Y which only result in a change in total thickness but do not noticeably affect the combined lens behavior. These new terms, while possibly causing a displacement in the image, do not change the power in diopters of the lens pair as the lenses are relatively displaced.

It may be desirable to add these additional terms in order to: 1) affect the displacement, and 2) to affect the profile of the lenses, for example to make the lenses more uniform in thickness or easier to manufacture. As an example of adding a term to make the lenses more uniform in thickness, consider the following examples, where we examine the cross section of the lens through the Y=0 slice.

Figure 8A:
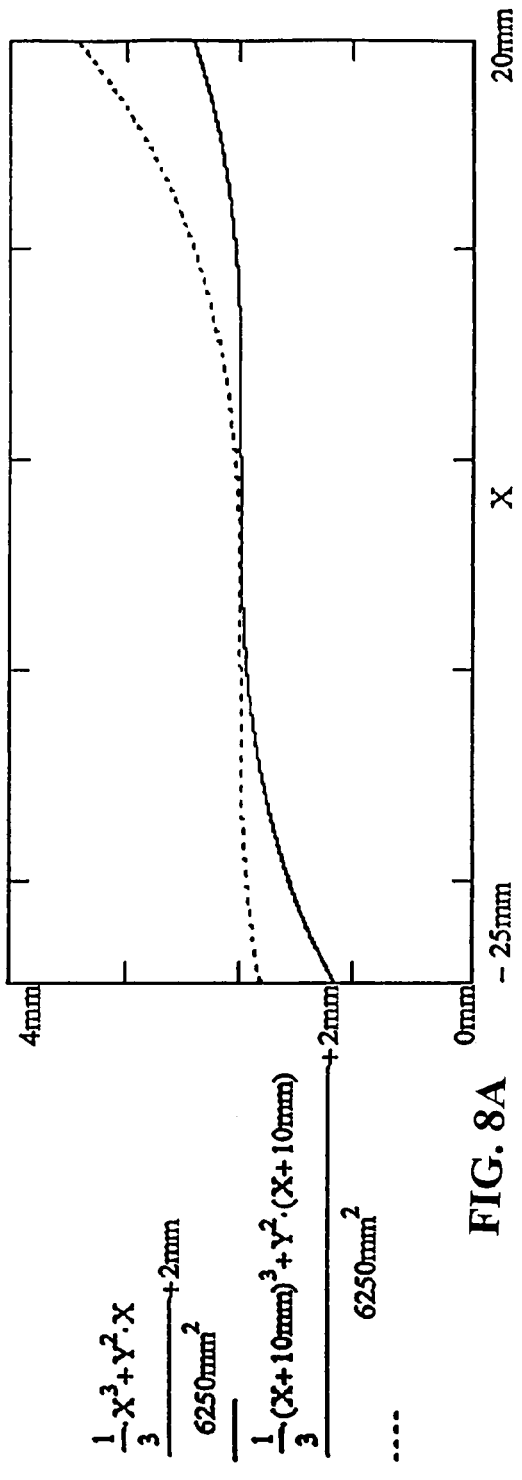
FIGS. 8A and 8B describe a technique for improving the profile of the lenses.

The plot shown in FIG. 8A is of the surface $Z=(X^3/3+XY^2)/(6250 \text{ mm2})+2 \text{ mm}$, a typical lens design, through the slice Y=0 (solid line). Also plotted is the complementary surface (dotted line), displaced by 10 mm in the x direction, a typical displacement. Note that the vertical Z scale is greatly exaggerated compared to the horizontal scale. Between the two surfaces is an air gap.

Figure 8B:
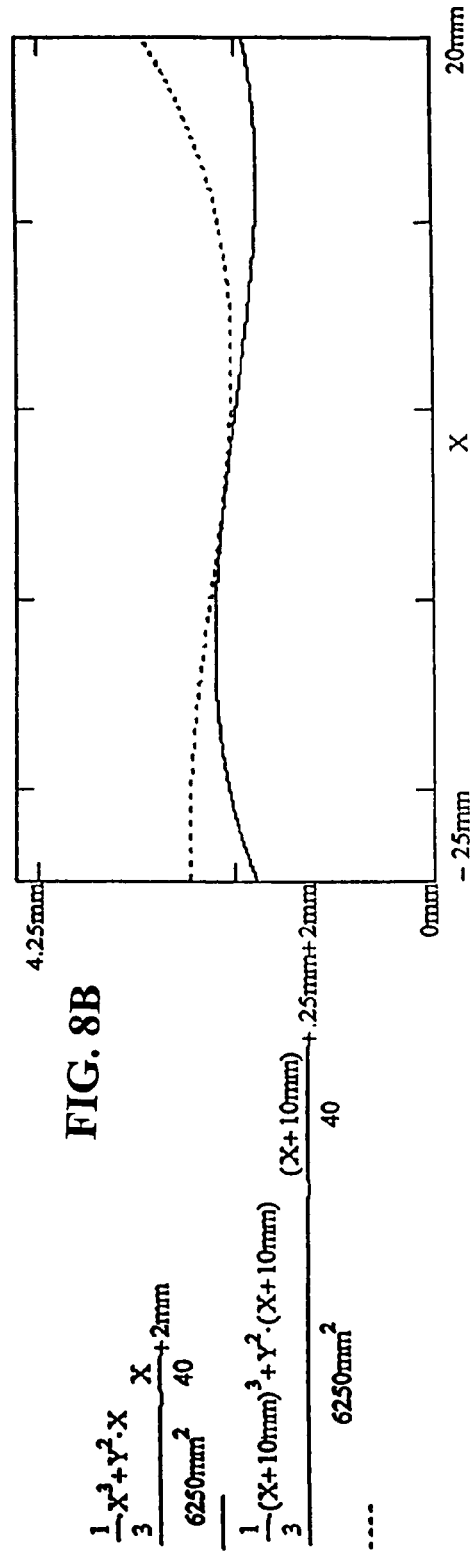

The plot shown in FIG. 8B adds the term X/40 to the surface function. In order for the lenses to not bump, the upper lens now must be displaced 10 mm/40=0.25 mm in the Z-direction as it is moved 10 mm in the X-direction. The performance of the lens pair is unchanged, but notice that the peak to valley displacement of the surfaces are smaller, and therefore the lenses may be easier to manufacture or mount into the glasses.

Using the Present Invention to Make Fixed-Lens Eyeglasses

Since the filing of the parent application, Applicant has realized that the techniques described in that application can be applied to greatly reduce the cost of providing eyeglasses. These techniques reduce needed inventory stocks of lenses to meet patient's needs for focus and astigmatism correction. These techniques are described below:

1. Sets of complementary lenses are prepared as described in the parent application, except the complementary lenses are set during a second stage of a manufacturing process and not adjusted. The objective of this is to be able to manufacture many different lens prescriptions with a small number of parts. The parts will be able to cover a range of focus settings. Preferably there will be relatively small number of certain, coarsely spaced, focus powers on lens pairs that are maintained in stock. Applicant believes that most eye-care facilities will choose to stock about 10 to 20 different focus power lens pairs. Fine-tuning will be accomplished by displacing the two lenses in the lens pair. The lens pair is then cut and placed into the frames. This process provides for the correction of focus but not astigmatism.
2. To also provide for the correction of focus and astigmatism a lens pair closest to the desired focus power is chosen from stock as described in 1) above. Adjustments are made in a first direction (the X-direction) to provide the desired focus. Then adjustments are made in a Y-direction perpendicular to the X-direction to apply astigmatism correction to the lenses. Here are the mathematics:
   a. Let the lens thickness of the first lens be f_lens1(X,Y)= $C*(X^3/3+XY^2)+t_0+$(any polynomial of degree <3), where C and to are constants.
   b. Let the lens thickness of the second lens be f_lens2(X,Y)=$-C*(X^3/3+XY^2)+t_0+$(the complementary polynomial).
   c. As described in more detail in the parent application and below, the lenses can also include an overall bow, or any polynomial degree less than 3, or can have a deviation which is not noticeable to the eye, or can be tapered from the center, or can include a base amount of constant correction which is not complementary (such as a base focus correction or a progressive lens correction)

d. Move the lenses with respect to each other in X and Y. The relative motion is most important, but for these calculations we will move the lenses in opposite directions.

e. Net thickness of both lenses is then f_lens1(X+dx,Y+dy)+f_lens2(X−dx,Y−dy)

f. This evaluates to $[2*C*dx*(X^2+Y^2)]+[2*C*dy*(2XY)]+[(2/3)*C*dx*(dx^2+3dy^2)]+2t_0]+$(a polynomial of degree <2)

g. The first bracketed term, proportional to dx, is the focus.

h. The second bracketed term, proportional to dy, is astigmatism in a certain direction.

i. The third term is just a net thickness, which the eye does not notice.

j. A polynomial of degree <2 introduces net thickness and wedge, which does not affect visual acuity.

k. Astigmatism comes in two directions, described by 2XY and $X^2-Y2$. These are equivalent to each other except for a 45° rotation. In order to make the lens pair correct both directions of astigmatism, the pair of lenses will need to be rotated, as a unit, after the offsets have been applied, up to plus or minus 45°. The focus is unaffected by this rotation.

l. After shifting and rotation, the lenses are cut out to fit into the frames.

3. Preferably the cubic surfaces are on the inside surfaces between the two lenses. This in general will provide better correction as compared to having the cubic surfaces on the outside surfaces, but requires a gap between the lenses. As an alternative, the cubic surfaces can be on the outside and matched spherical surfaces can be on the inside. After adjustment, the lenses are glued together (preferably with refractive index matching glue) as a single unit with no air gap. This should provide a superior mechanical structure, and the internal surfaces are removed, but the optical performance may be somewhat inferior.

Computer Simulations

Various optical designs based on the present invention have been tested with computer simulations. Specific simulations were made using computer aided design software available from Zemax Development Corporation with offices in Bellevue, Wash. Several simulations were made for lens pairs with optical powers of 0 diopter, +2 diopters, and −2 diopters at angles of 0 degrees, 30 degrees up, 30 degrees down, 30 degrees left and 30 degrees right. In all cases the simulations show results that are about the same or better than standard prior art spectacle lenses for correcting focus. Typical examples of these simulations are shown in FIGS. 1A through 6B.

Zero Diopters

Figure 10A:
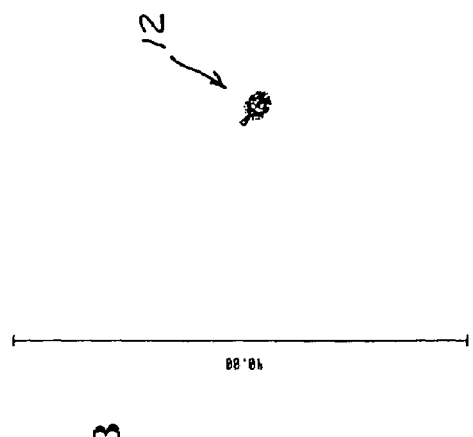
Figure 10B:
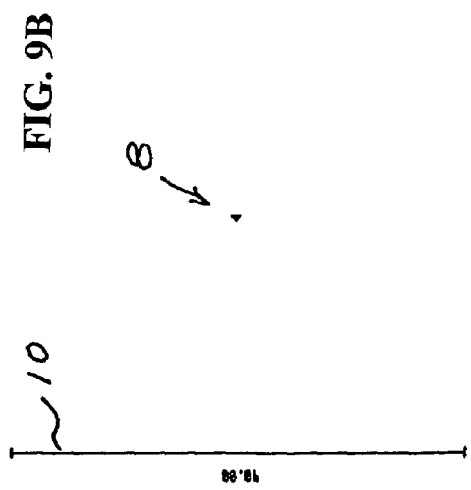
Figure 9A:
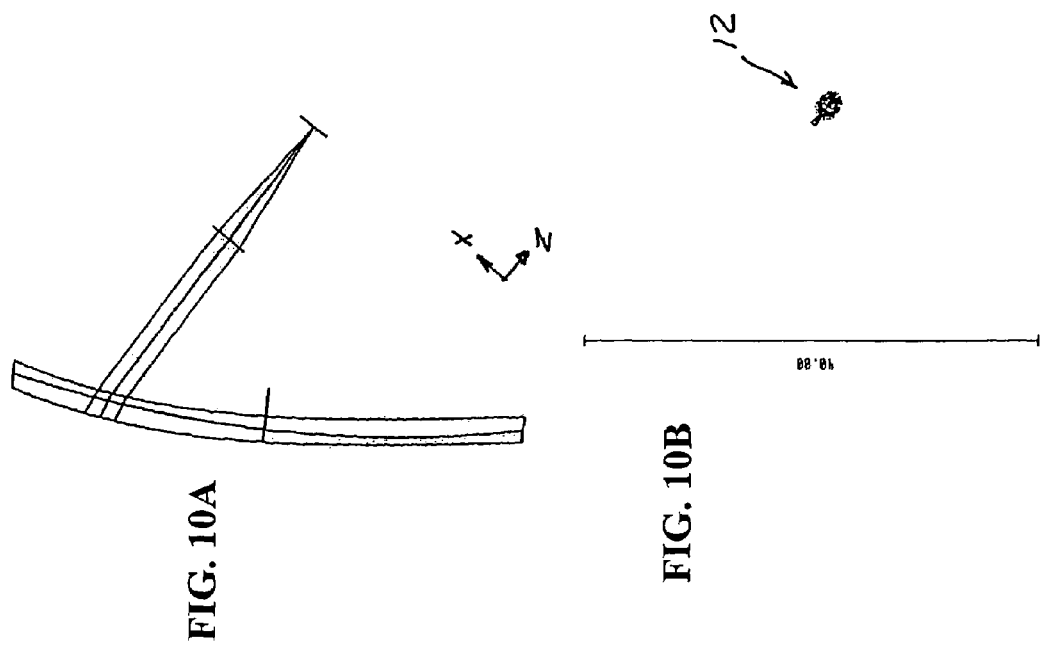
Figure 9B:
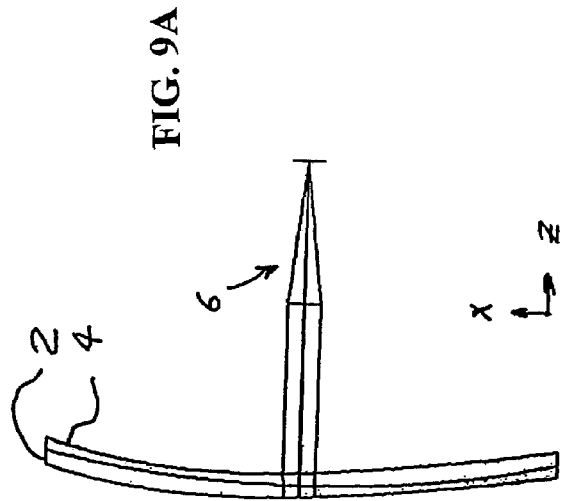

FIG. 9A is a simulations of a 0 diopter combinations of two lenses. The two lenses are shown at 2 and 4. The optics of a typical human eye is simulated at 6. The resulting spot size on the retina is shown in FIG. 9B at 8. This spot size can be compared with 40 micron reference line 10. The average rms radius of the spot is 0.323 micron. This is smaller than the diffraction limit of the human eye, which is about 0.7 microns for the average rms radius. FIG. 10A shows the result of 0 diopters looking up at 30 degrees. The resulting spot size in this case is shown at 12 in FIG. 10B. In this case the average rms radius is measured at 0.842 microns, which is just slightly larger than the 0.7 micron rms diffraction limit of the human eye.

Plus Two Diopters

Figure 11A:
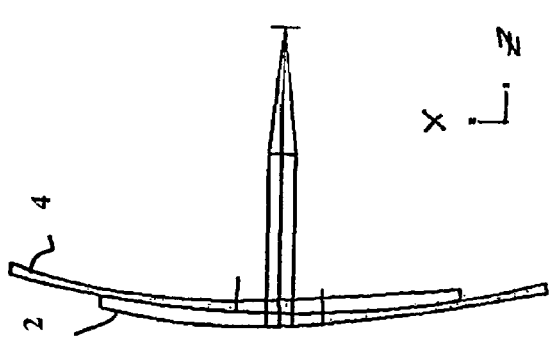
Figure 12A:
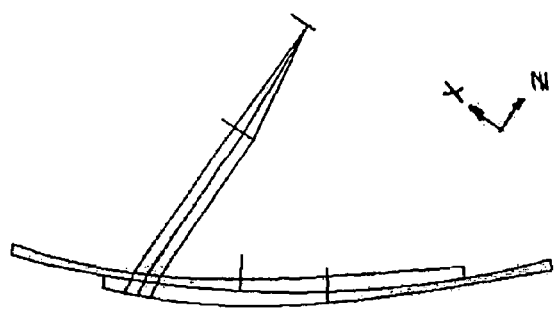
Figure 11B:
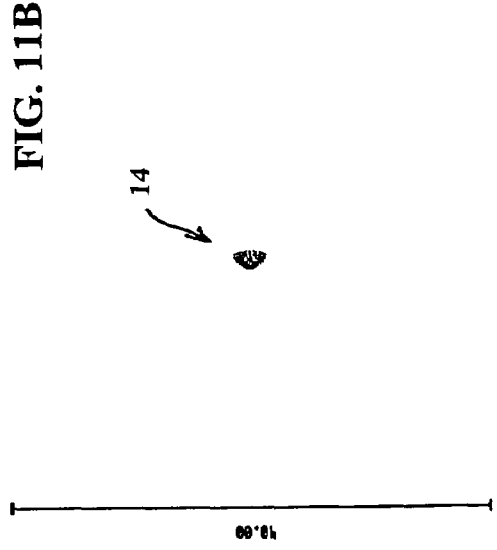
Figure 12B:
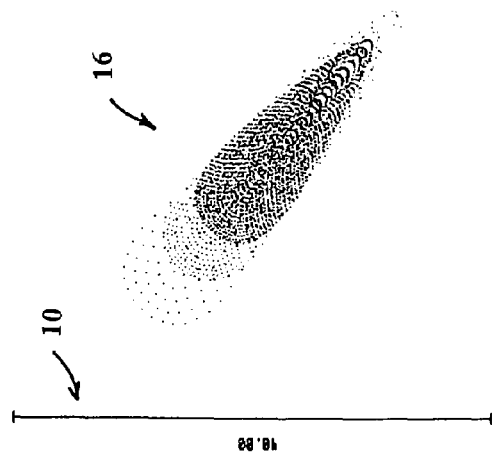

FIGS. 11A and 11B show a +2 diopter simulation looking straight ahead. Lens 2 has been positioned downward with respect to lens 4. The resulting spot size is shown at 14 in FIG. 11B and as above can be compared with 40 micron reference line 10. The average rms radius is measured at 0.558 microns, which is smaller than the 0.7 micron diffraction limit rms radius of the human eye. FIGS. 12A and 12B show the results +2 diopters looking up at 30 degrees. The resulting spot size in this case is shown at 16 in FIG. 12B. Much of the size of spot 16 is attributable to chromatic aberration. In this case the average rms radius is measured at 6.675 microns, which is about 10 times larger than the 0.7 micron rms diffraction limit of the human eye. However, the optical error associated with this enlarged spot size is about the same as experienced with typical spectacle lenses at off axis angles of about 30 degrees and the error is unlikely to be noticeable by a typical wearer.

The spot size 16 in FIG. 12B may to some readers appear relatively large. However, the reader is encouraged to keep in mind the actual magnitude of these optical aberrations in prospective. For example, the 40 micron reference line 10 is approximately equal to the thickness of a typical human hair. Light detectors in the eye are tiny rods and cones. Cones (which are sensitive to color) are typically about 6 microns in diameter and a little smaller in the fovea region. Rods are about 2 microns in diameter but many of these rods are typically connected to the same nerve so their contributions are summed.

Minus Two Diopters

Figure 13A:
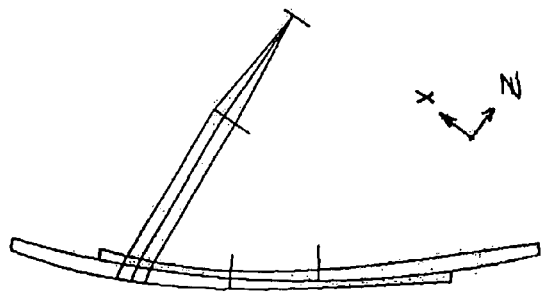
Figure 13B:
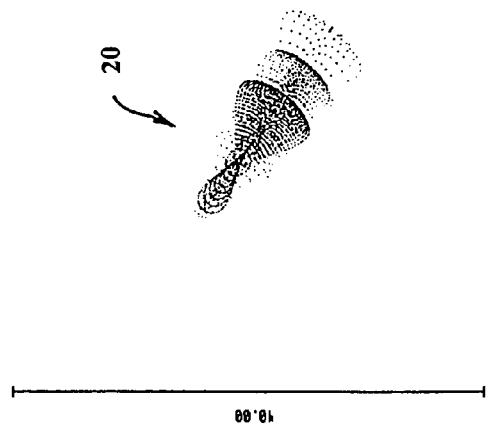
Figure 14A:
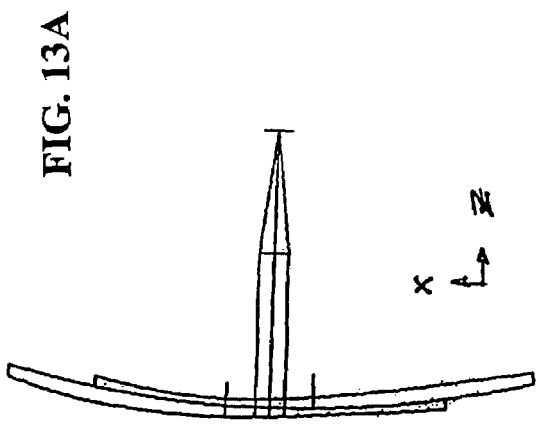
Figure 14B:
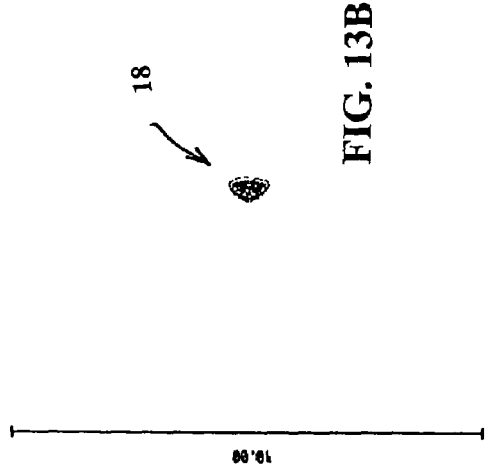
Figure 15:
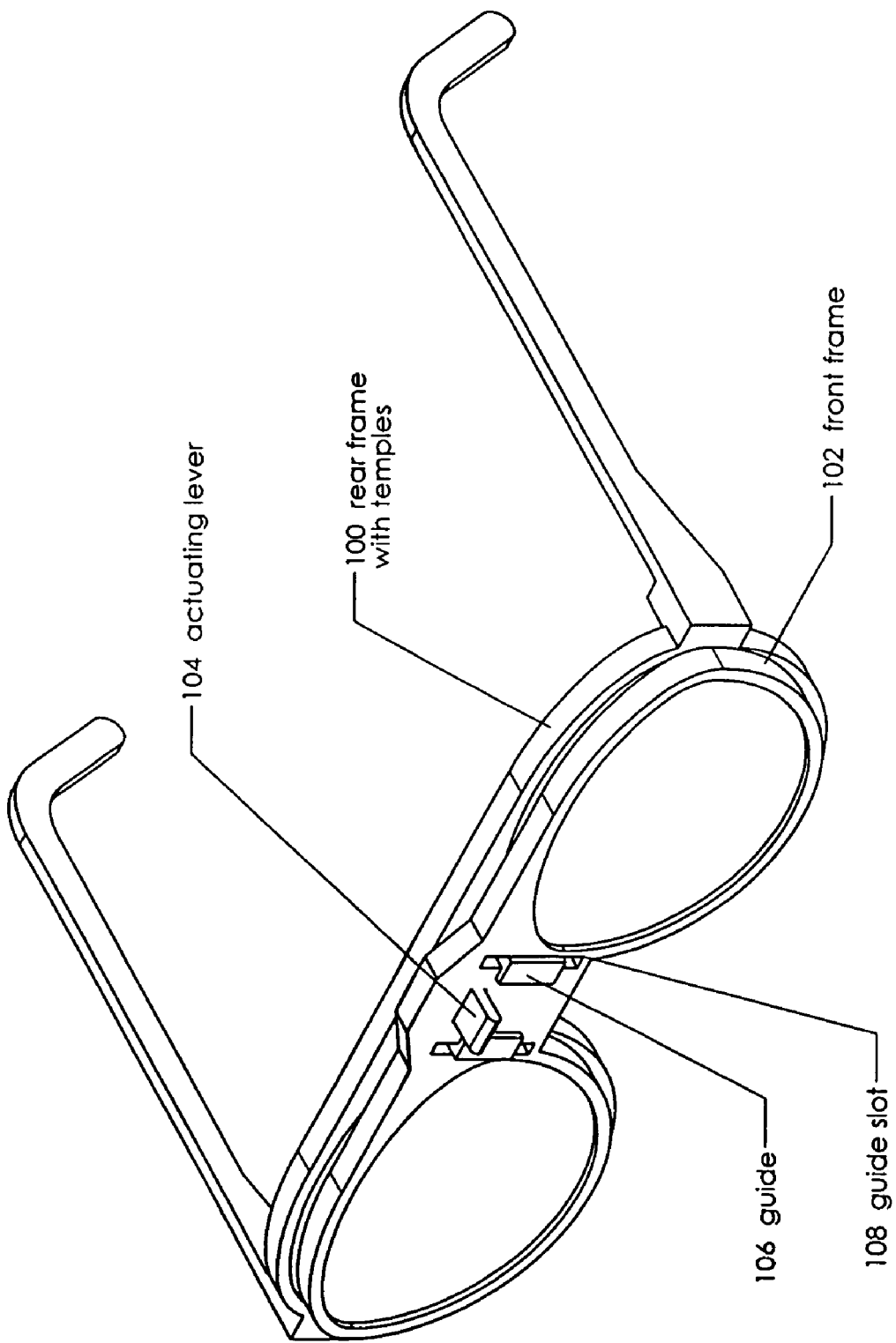

FIGS. 13A and 13B show a −2 diopters simulation looking straight ahead. Lens 2 has been positioned upward with respect to lens 4. The resulting spot size is shown at 18 in FIG. 13B. The average rms radius is measured at 0.558 microns, which is smaller than the 0.7 micron diffraction limit rms radius of the human eye. FIGS. 14A and 14B show the results −2 diopters looking up at 30 degrees. The resulting spot size in this case is shown at 20 in FIG. 14B. In this case the average rms radius is measured at 4.789 microns, which is about 7 times larger than the 0.7 micron rms diffraction limit of the human eye. However, as explained above, the optical error associated with this enlarged spot size is about the same as experienced with typical spectacle lenses at off axis angles of about 30 degrees and the error is unlikely to be noticeable by a typical wearer.

Other Prototype Designs

Additional prototype designs developed by Applicant are shown in FIGS. 15 through 19D. In this design, rear frame 100 is positioned on a wearer in the same manner as regular glasses. Front frame 102 is mounted on frame 100 with slide guide 106 and slide slot 108 so that front frame 102 is free to slide up and down relative to rear frame 100 but can not move sideways relative to rear frame 100. The wearer is able to position front frame 102 relative to rear frame 100 by pushing on actuating lever 104 in order to adjust the focus of the lenses. Closes tolerances between guide 106 and guide slot 108 hold the front frame in position after it has been positioned by the wearer.

Figure 16A:
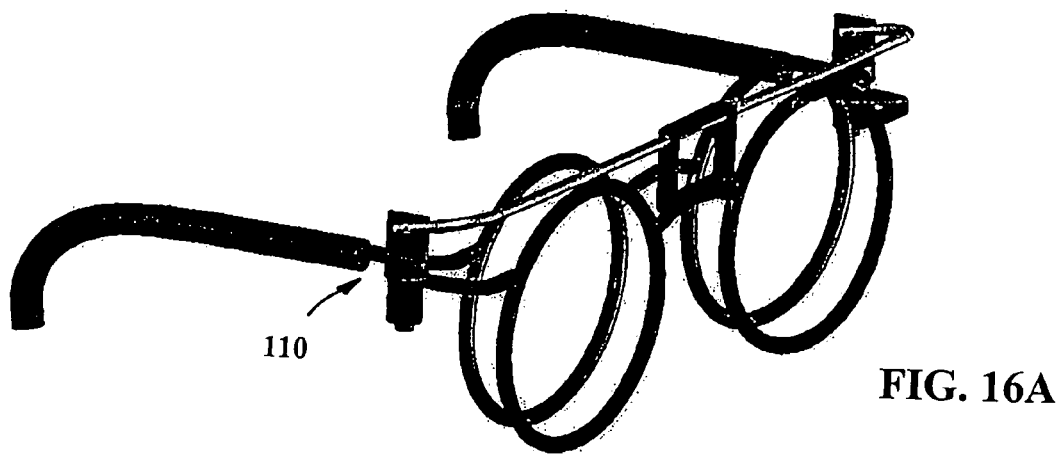
Figure 16B:
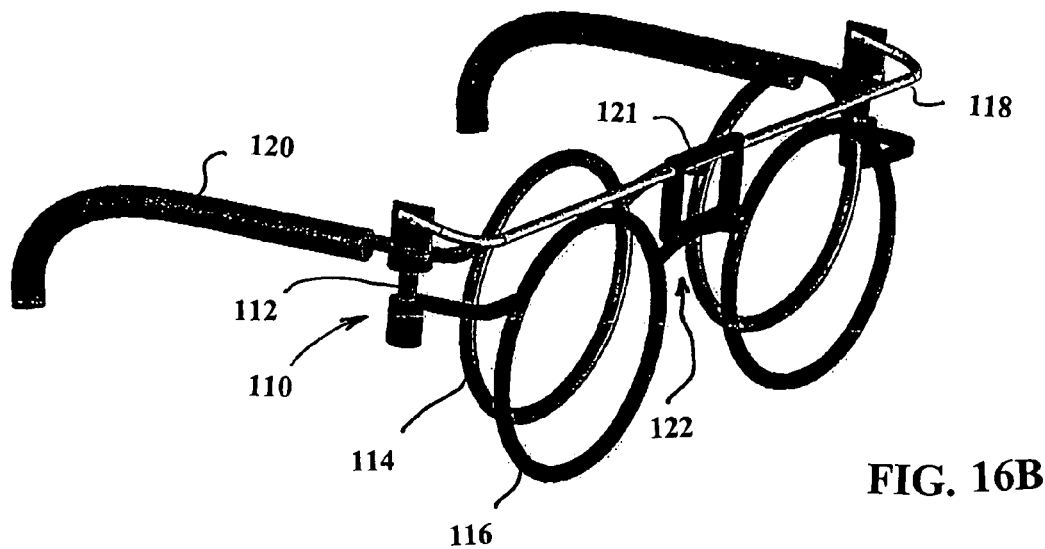

FIGS. 16A and 16B show another frame design for adjusting the front frame up and down relatively to the rear frame. In this case slide ring 110 that is a part of front frame 116 slides up and down on shaft 112 that is a part of rear frame 114. The wearer adjusts the relative positions of the two frames by adjusting pivot bar 118. The earpieces 120 are a part of rear frame 114 and the nose rest 122 is a part of front frame 115. Front frame 115 hangs from pivot bar 118 via hang element 121 that pivots about pivot bar 118 and a pivot connection at nose rest 122 so that the displacement of frame 116, produced by the pivoting of pivot bar 118, does not alter the spacing between the two frames.

FIGS. 16C through 16I show features of a frame design similar to the one described above. This frame includes back lens assembly 124, front lens assembly 126, a torsion bar assembly 128, two adjusting side bars 130 and a nose piece assembly 132 and ear piece 134. The torsion bar assembly includes torsion bar 128A two sleeves 128B (through which bar 128A is free to pivot) that are rigidly attached to back lens assembly at locations 128C. Bar 128A is pivotably attached to front lens frame assembly 126 at locations 128D. The two adjusting side bars 130 are pivotably attached to ear piece 134 at location 134A and are attached to front lens assembly at location 134B as shown in FIG. 16G. Back lens assembly 124 includes peg attachment 124A which is comprised of two curved pegs as shown in FIG. 16H. Front lens assembly 126 includes two sleeve attachments 126A each attachment having two sleeves that slide in a general up and down direction on the pegs of peg attachment 124A. Preferably the curve of the pegs matches the nominal radius of curvature of the lenses. This frame also includes nose piece assembly 136 on which both front and back lens assemblies rest via sleeves 124B and 126B and stops 136A. With this feature the eyeglasses are positioned based on the location of the lowest of the two lens assemblies. Therefore, the movement of the center of the lens units relative to the wearer's eyes moves only half as far as in the FIG. 15 example. Front lens assembly 126 is raised relative to back lens assembly 124 by squeezing bar 130 and earpiece 134 at location 134A and lowered by squeezing at 134B as shown in FIG. 16G. Torsion bar 128 is preferably stiff enough to assure that the relative motion of the lens elements in both lens units is approximately the same. The movement up or down of the front lens elements in one of the lens units relative to the rear lens element induces a torque on torsion bar 128A which produces a corresponding movement in the front lens element in the other lens unit.

Figure 18A:
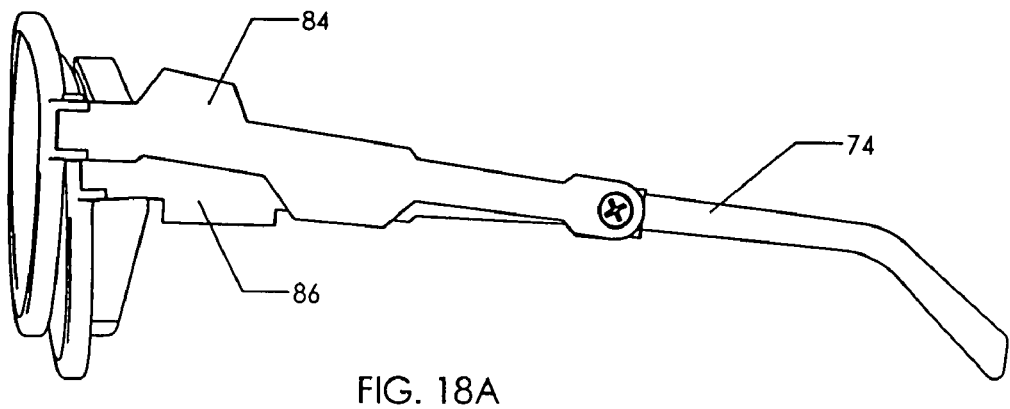
Figure 18B:
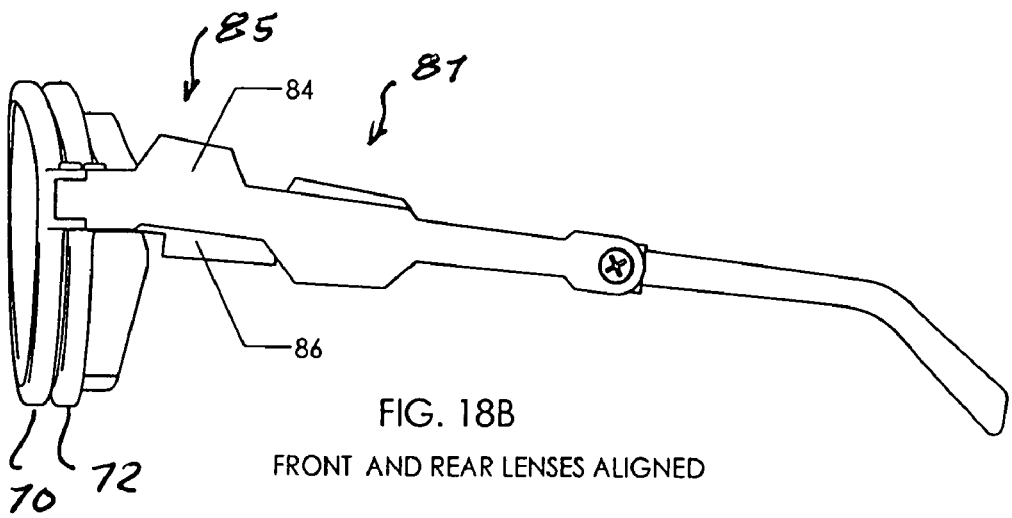

FIGS. 17A through 17E show features of a prototype design currently in fabrication by Applicants and his fellow workers. In this version support frame 74 fits on the wearers head just as regular glasses. The lenses, both rear lenses 98R and 98L and front lenses 96R and 96L are contained in separate frames, rear frame 72 and front frame 70, that move relative to support frame 74. Frames 70 and 72 pivot about left and right pivot mounts (left mount 92L and pivot screw 94L are shown). FIG. 18B shows the two lenses aligned. The wearer raises front lenses 96L and 96R in front frame 70 and lowers rear lenses 98L and 98R in rear frame 72 to positions such as the one shown in FIG. 18A by squeezing frame temple arms at position 87 as shown in FIG. 18B. The wearer moves the lenses in the opposite directions by squeezing frame temple arms at position 85 as shown in FIG. 18B. The lenses are aligned in FIG. 18B.

Figure 18C:
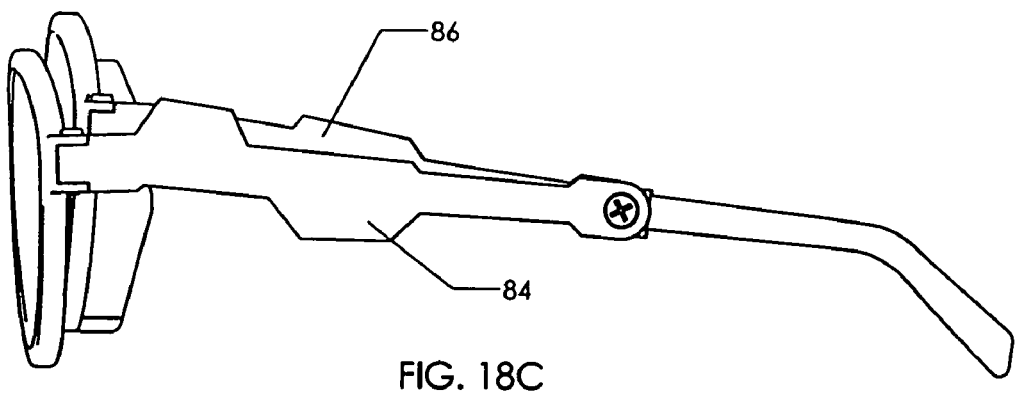

FIGS. 19A through 19D shows a variation of the FIGS. 18 version. The FIGS. 19 version is the same as the FIGS. 18 version except the wearer adjusts the relative positions of the lenses by turning cam 60 instead of squeezing the temple arms.

Detailed Lens Molding Specifications

Figure 20A:
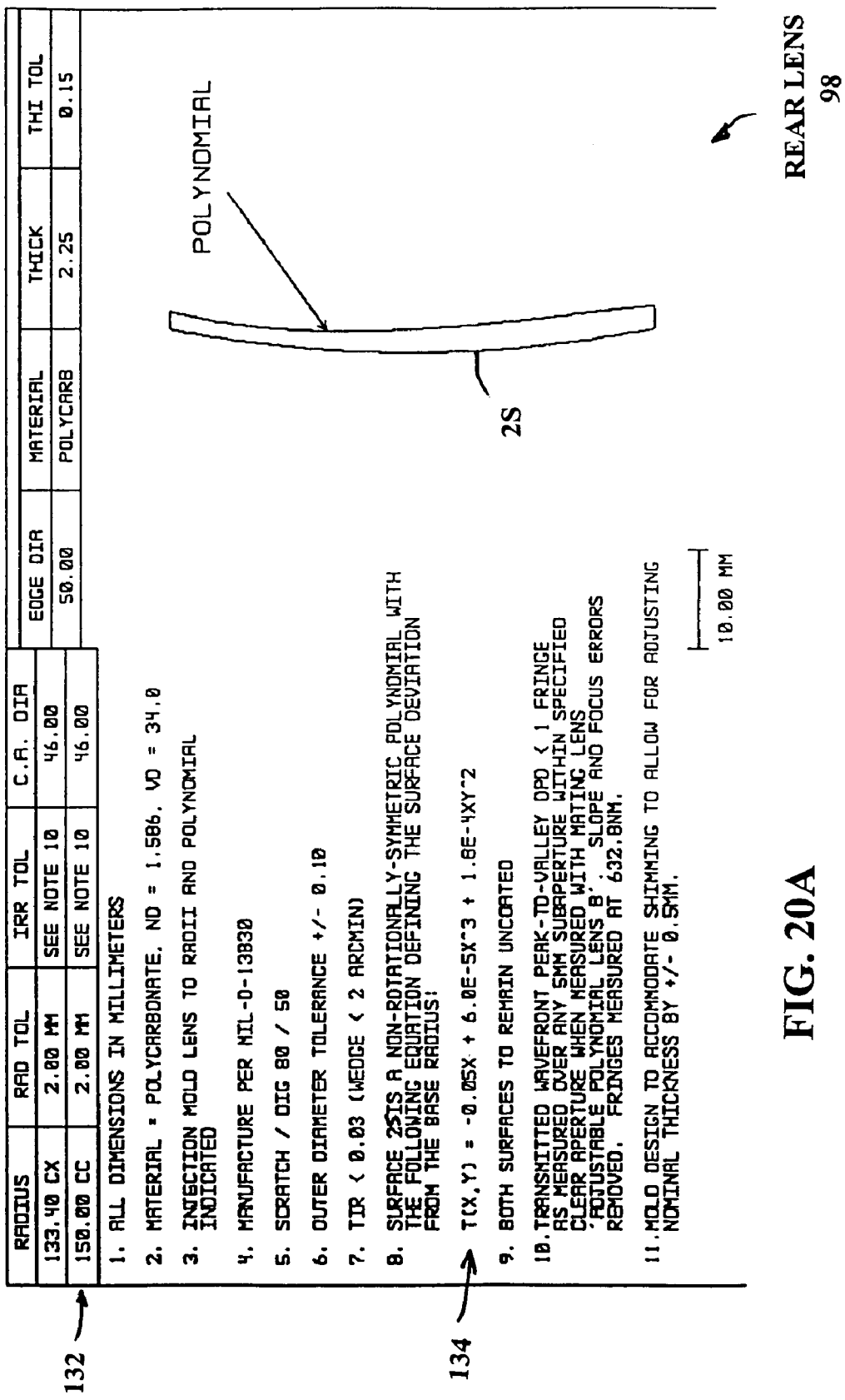

Detailed molding specifications for two lenses of a preferred embodiment are shown in FIGS. 20A and 20B. FIG. 20A provides the specifications for the rear lens and FIG. 20B provides the specifications for the front lens. The material is polycarbonate as shown at 130 in the two figures. The rear surface of rear lens 98 is convex spherical with a radius of 133.4 mm and the front surface of front lens 96 is concave spherical with a radius of 171.0 mm as shown at 132 in the figures. The front surface 2S of rear lens 98 is convex and the rear surface 1S of front lens 96 is concave and both are nominally spherical with radii of 150 mm as shown at 132 in both figures. However the surfaces of both lenses are modified according to the surface equations given at 134 in the figures. These equations are:

$$T(X,Y) = -0.05X + 6 \times 10^{-5} X^3 + 1.8 \times 10^{-4} X^2,$$

the same for both lenses. The reader should note that $T(X,Y)$ defines the modification to the base radius which is 150 mm in both cases. Modifying the base radius in both cases means that the amount removed from the surface one of the lenses is the same as the amount added to the surface of the other lens. This means that the surfaces are complementary to each other. Subtracting the thicknesses described by the above equation from both surfaces would have the same effect. The figures specify typical lens tolerances. The clear aperture is 46 mm and the edge diameter of each lens is 50 mm. The reader should also note that a $C_3 X$ term (i.e. $-0.05X$) is added to one surface and subtracted from the complementary surface to reduce the profile variation of each of the lenses. The spherical surfaces at the rear of the front lens 96 and the front of rear lens 98 give the lens combination a base null power of 1.0 diopter when the two lenses are aligned.

Direction of Lens Movement

Preferably the relative motion of the two lens elements in a lens unit is in directions related to the nominal curvature of the lens unit. For example the nominal curvature of the lens unit described in FIGS. 20A and 20B is 150 mm. Therefore, their relative motion preferably should be along a radius approximately 150 mm behind the center of the lens unit. However, optical analysis performed by Applicants has shown that tolerances on this issue is loose and (for the 150 mm nominal curvature example) the lens unit performs acceptably if the radius is within the range of about 50 mm to infinity (parallel motion). For embodiments where the nominal curvature of the lenses is flat as in the examples shown in FIGS. 2 through 3B(S), relative motion should be parallel. In the examples shown in FIGS. 17A through 17E and 19A through 19D the relative motion of the two lenses is defined by radii of about 50 mm. In the FIG. 15 example a curvature such as 150 mm could be designed into guide 106 and guide slot 108. In the 16A and 16B example the shaft 112 and sleeves 110 could be designed for a curvature of 150 or any other desired curvature.

Variations

The reader should understand that the present invention is not limited to the specific embodiments described above and that many modifications and additions or deletions could be made to those described embodiments. For example lenses can be made as described above, except that the equation describing the lens thickness only applies in a center "sweet spot" region. Outside of this region the lens shape is optimized with thickness or other concerns in mind. The lens surfaces can all have a common curvature term, and the lenses can be displaced along a curved surface as opposed to pure lateral displacement. These surfaces can have the same third degree polynomial thickness variation, but on a curved basis. There can be a net thickness on the lens unit in the null position to provide an optical base figure. This optical base figure could be applied to any or all of the lens elements in the lens unit. As an example, the complementary cubic polynomial surfaces may be designed to provide up to plus or minus two diopters of focus correction. In this case, eye care professionals could select from different sets of lens units with an offset focus base figure spaced every four diopters. As another example, a progressive surface could be incorporated into the optical base figure, which is a common shape incorporated into prescription lenses to help mitigate presbyopia.

There can be more than two lenses. For example, there could be a pair of stationary lenses on the outside, each with half of one of the thickness functions, with the moving lens with the complement in between. FIGS. 2A through 2D and FIGS. 3A and B provide a comparison between a lens system with single lens units and a system described above with one of the lens units being a pair of stationary lenses with a moving lens in between the pair. FIGS. 2A and 2B represent a lens system with single lens units with FIG. 2A showing the null position and FIG. 2B showing a shifted position. FIGS. 2C and 2D represent a lens system with one of the lens units being comprised of two separated lenses and the other lens unit being a single lens positioned in between the two lens of the first lens unit. FIG. 2C represents the null position and FIG. 2D represents the shifted position. FIG. 3A represents the effective combined total thickness for both null positions (i.e., FIGS. 2A and 2C) and FIG. 3B represents the effective combined total thickness for both shifted positions (i.e., FIGS. 2B and 2D).

The lens can move up and down, side to side, or at any other direction predominately perpendicular to the wearer's line of sight. The moving lenses for each eye can move in common (best for up and down) or in different directions such as out and in away from the nose. Also, both lenses for each eye can move at the same time in opposite directions, as opposed to the first example given where one of the lens is fixed to the eyeglass frame. These special surfaces can be applied to any two of the four surfaces of the two lenses; however, it is better to apply the special surfaces to the inside surfaces as shown in the examples since second order effects depend on distances between the special surfaces.

Lens units of the present invention can be utilized in many applications other than for eyeglasses. The concepts can be applied to almost any situation where adjustable focusing is needed. These include microscopes, cameras, copy machines and magnifying glasses.

The present invention can be used for eye examinations. Lateral adjustments can be provided with a micrometer operated by the patient to focus his eyes at various distances and having a read-out on a computer screen indicating lens power needed for focusing at those distances. Such devices might be provided at drug stores selling inexpensive lenses for reading. In addition the lenses might be used to confirm a prescription.

Manufacturing techniques that could be employed include: machining (such as with numerically controlled equipment), molding, special materials with curing and use of gradient index lenses for which thickness is replaced by "optical path length" defined by (n−1)*(thickness) where n is the index of refraction. Potential range finders include optical, laser and acoustic. Cues for automatic changing of focus could include blinking, eyebrow motion and hand switches. Putting a slight curvature (such as spherical, cylindrical or ellipsoidal) on both lenses does not change the power of the lenses and could be incorporated.

In the preferred embodiments and in the claims, surface shapes are sometimes defined with mathematical equations. Minor modifications to the equations can be made without causing variations that could significantly adversely affect the performance of the lens systems. Therefore, in his claims Applicant has used the term "approximately" in connection with these equations with the intention of claiming systems that utilize surfaces that are defined by equations that are not exactly the same as the referenced equations but achieve the same result within the tolerance of the lens system as it is being applied. When applied to eyeglasses the applicable tolerance is the ability of the human eye to detect a difference.

The reader should understand that the present invention is not limited to the specific embodiments described above and that many modifications and additions or deletions could be made to those described embodiments. Therefore, the scope of the invention should be determined by the appended claims and their legal equivalents.

What is claimed is:

1. An adjustable focus lens system for adjusting focus in a viewing direction, said adjustable focus lens system comprising:

A) at least one lens unit, with each of said at least one lens unit comprising a first lens element and a second lens element, with each of the first and second lens elements having at least one specially designed surface such that adjustments of the relative positions of said first and said second lens elements in a direction perpendicular or approximately perpendicular to a viewing direction results in changes in the combined focusing power of the two lens elements and B) an adjustment mechanism for moving in each of said at least one lens unit at least one of the lens elements relative to the other lens element in a direction perpendicular or approximately perpendicular to the viewing direction, so as to adjust the focusing power of the at least one lens unit;

wherein said at least one lens unit is two lens units combined to make a pair of eye glasses and said adjustment mechanism is chosen from a group of adjustment mechanisms consisting of:

1) an adjustment mechanism adapted to be operated by a finger force against a friction force to slide one lens element in each lens unit relatively to the other lens element in the lens unit, 2) an adjustment mechanism comprising a two or three position lever adjustment adapted to be operated manually, 3) an adjustment mechanism comprising a support frame and two separate frames holding the lenses that pivot about pivot points on the earpiece of the support frame, 4) an adjustment mechanism comprises two rear lenses are mounted in a support frame and two front lenses mounted in a separate frame that pivots about a point on an earpiece of the support frame, 5) an adjustment mechanism comprises a pivor bar adapted to pivot produces lateral displacement of the lenses relative to each other when the torsion bar is twisted, 6) an adjustment mechanism having a control means adapted to assure that the relative movement of the lens elements in each lens unit is the same or approximately the same, 7) an adjustment mechanism having a torsion bar adapted to assure that the relative movement of the lens elements in each lens unit is the same or approximately the same, 8) an adjustment mechanism having a guide means for guiding the movement of the lens elements in each lens unit to assure that the movement of each lens element is in a direction approximately perpendicular to a viewing direction, and 9) an adjustment mechanism having a guide means for guiding the movement of the lens elements in each lens unit to assure that the movement of each lens element is in a direction mapping an arc of a circle approximately perpendicular to a viewing direction.

2. The lens system as in claim 1 wherein said adjustment mechanism is adapted to be operated by a finger force against a friction force to slide one lens element in each lens unit relatively to the other lens element in the lens unit.

3. The lens system as in claim 1 wherein said adjustment mechanism comprises a two or three position lever adjustment adapted to be operated manually.

4. The lens system as in claim 1 wherein said adjustment mechanism comprises a support frame and two separate frames holding the lenses that pivot about pivot points on the earpiece of the support frame.

5. The lens system as in claim 1 wherein said adjustment mechanism comprises two rear lenses are mounted in a support frame and two front lenses mounted in a separate frame that pivots about a point on an earpiece of the support frame.

6. The lens system as in claim 1 wherein said adjustment mechanism comprises a pivor bar adapted to pivot produces lateral displacement of the lenses relative to each other when the torsion bar is twisted.

7. The lens system as in claim 1 and further comprising a control means adapted to assure that the relative movement of the lens elements in each lens unit is the same or approximately the same.

8. The lens system as in claim 1 and further comprising a torsion bar adapted to assure that the relative movement of the lens elements in each lens unit is the same or approximately the same.

9. The lens system as in claim 1 and further comprising a guide means for guiding the movement of the lens elements in each lens unit to assure that the movement of each lens element is in a direction approximately perpendicular to a viewing direction.

10. The lens system as in claim 9 wherein said direction maps an arc of a circle defining a lens movement radius.

11. The lens system as in claim 10 wherein said lens units define a nominal radius and said lens movement radius is approximately equal to or larger than said nominal radius.

12. The lens system as in claim 11 wherein said movement radius is approximately equal to said nominal radius.

13. The lens system as in claim 1 wherein said adjustment mechanism is adapted to move the two lens elements in each lens unit in opposite directions.

14. The lens system as in claim 13 wherein said opposite directions are opposite directions on a curve.

15. The lens system as in claim 14 wherein said curve is a circle.

16. The lens system as in claim 1 wherein said adjustment also comprises a nose piece adapted to assure that relative movement of the two lens element in each lens unit is in opposite directions from a central point.

17. The lens system as in claim 16 wherein said central point is approximately co-aligned with a line of sight from an eye of a wearer of the lens system.

18. The lens system as in claim 1 wherein said adjustment mechanism comprises a front lens assembly, a rear lens assembly and a support frame wherein said front lens assembly and said rear lens assembly are adapted to move in opposite directions relative to said support frame.

19. An adjustable focus lens system for adjusting focus in a viewing direction, said adjustable focus lens system comprising at least one lens unit, with each of said at least one lens unit comprising a first lens element and a second lens element, with each of the first and second lens elements having at least one specially designed surface such that adjustments of the relative positions of said first and said second lens elements in a direction perpendicular or approximately perpendicular to a viewing direction results in changes in the combined focusing power of the two lens elements;

wherein the thickness of a portion of one of the lens elements, defining a sweet spot, is defined approximately by an equation comprising the following terms:

$$Z(X,Y)=C_1*(X^3/3+XY^2)+C_2,$$

and the thickness of a portion of the other lens element is described approximately by an equation comprising the following terms:

$$Z_C(X,Y)=-C_1*(X^3/3+XY^2)+C_3,$$

where $C_1$, $C_2$ and $C_3$ are constants, and the relative motion of the two said lens units is in the predominantly X direction; and wherein the thicknesses of portions of both lenses outside the sweet spots are substantially different from thicknesses defined by the above equations.

20. The lens system of claim 19 wherein said sweet spot is approximately centered at a location directly in front of a wearer's eyes when the wearer is looking straight ahead.

21. The lens system as in claim 20 wherein thicknesses of said lens outside said sweet spot is described by an equation defining desired lens thicknesses of both lens units taken together and the lens thickness of each of the lens units outside the sweet spot is determined by integrating the equation for desired lens thicknesses with respect to X.

22. The lens system as in claim 19 wherein the equations for both elements also comprise a CX term to reduce profile variation of the lens elements.

23. An adjustable focus lens system for adjusting focus in a viewing direction, said adjustable focus lens system comprising at least one lens unit, with each of said at least one lens unit comprising a first lens element and a second lens element, with each of the first and second lens elements having at least one specially designed surface such that adjustments of the relative positions of said first and said second lens elements in a direction perpendicular or approximately perpendicular to a viewing direction results in changes in the combined focusing power of the two lens elements:

wherein the thickness of at least a portion of one of the lens elements, defining a sweet spot, is defined approximately by an equation comprising the following terms:

$$Z(X,Y)=C_1*(X^3/3+XY^2)+C_2,$$

and the thickness of at least a portion of the other lens element is described approximately by an equation comprising the following terms:

$$Z_C(X,Y) = -C_1 * (X^3/3 + XY^2) + C_3,$$

where $C_1$, $C_2$ and $C_3$ are constants, and the relative motion of the two said lens units is in the predominantly X direction; wherein said lens adjustment mechanism is a motor driven lens adjustment mechanism; and wherein said motor driven lens adjustment mechanism is based on a measured distance to a viewed object.

24. An adjustable focus lens system for adjusting focus in a viewing direction, said adjustable focus lens system comprising at least one lens unit, with each of said at least one lens unit comprising a first lens element and a second lens element, with each of the first and second lens elements having at least one specially designed surface such that adjustments of the relative positions of said first and said second lens elements in a direction perpendicular or approximately perpendicular to a viewing direction results in changes in the combined focusing power of the two lens elements:

wherein the thickness of at least a portion of one of the lens elements, defining a sweet spot, is defined approximately by an equation comprising the following terms:

$$Z(X,Y) = C_1 * (X^3/3 + XY^2) + C_2,$$

and the thickness of at least a portion of the other lens element is described approximately by an equation comprising the following terms:

$$Z_C(X,Y) = -C_1 * (X^3/3 + XY^2) + C_3,$$

where $C_1$, $C_2$ and $C_3$ are constants, and the relative motion of the two said lens units is in the predominantly X direction; wherein said lens adjustment mechanism is a motor driven lens adjustment mechanism; and wherein said motor driven lens adjustment mechanism is based on measurements of the wearer's eye positions.

25. An adjustable focus lens system for adjusting focus in a viewing direction, said adjustable focus lens system comprising at least one lens unit, with each of said at least one lens unit comprising a first lens element and a second lens element, with each of the first and second lens elements having at least one specially designed surface such that adjustments of the relative positions of said first and said second lens elements in a direction perpendicular or approximately perpendicular to a viewing direction results in changes in the combined focusing power of the two lens elements:

wherein the thickness of at least a portion of one of the lens elements, defining a sweet spot, is defined approximately by an equation comprising the following terms:

$$Z(X,Y) = C_1 * (X^3/3 + XY^2) + C_2,$$

and the thickness of at least a portion of the other lens element is described approximately by an equation comprising the following terms:

$$Z_C(X,Y) = -C_1 * (X^3/3 + XY^2) + C_3,$$

where $C_1$, $C_2$ and $C_3$ are constants, and the relative motion of the two said lens units is in the predominantly X direction; wherein said lens adjustment mechanism is a motor driven lens adjustment mechanism; and wherein said motor driven lens adjustment mechanism is based on special cues from the wearer.

26. An adjustable focus lens system for adjusting focus in a viewing direction, said adjustable focus lens system comprising at least one lens unit, with each of said at least one lens unit comprising a first lens element and a second lens element, with each of the first and second lens elements having at least one specially designed surface such that adjustments of the relative positions of said first and said second lens elements in a direction perpendicular or approximately perpendicular to a viewing direction results in changes in the combined focusing power of the two lens elements;

wherein the relative motion of the said lens elements has, in addition to predominantly translation perpendicular to a viewing direction, a small amount of translation along the viewing direction.

27. An adjustable focus lens system for adjusting focus in a viewing direction, said adjustable focus lens system comprising at least one lens unit, with each of said at least one lens unit comprising a first lens element and a second lens element, with each of the first and second lens elements having at least one specially designed surface such that adjustments of the relative positions of said first and said second lens elements in a direction perpendicular or approximately perpendicular to a viewing direction results in changes in the combined focusing power of the two lens elements;

wherein the relative motion of the said lens elements has, in addition to the predominantly translation perpendicular to a viewing direction in, a small amount of relative rotation.

* * * * *